US009615046B2

(12) United States Patent
Senta et al.

(10) Patent No.: US 9,615,046 B2
(45) Date of Patent: Apr. 4, 2017

(54) IMAGE CONVERSION APPARATUS AND METHOD REDUCING NUMBER OF PIXEL COUNTS PROCESSING

(71) Applicant: FUJITSU LIMITED, Kawasaki-shi, Kanagawa (JP)

(72) Inventors: Yosuke Senta, Kawasaki (JP); Taro Kikuchi, Kawasaki (JP); Hideyuki Koike, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 122 days.

(21) Appl. No.: 14/619,868

(22) Filed: Feb. 11, 2015

(65) Prior Publication Data
US 2015/0156436 A1 Jun. 4, 2015

Related U.S. Application Data

(63) Continuation of application No. PCT/JP2012/071917, filed on Aug. 29, 2012.

(51) Int. Cl.
*H04N 5/378* (2011.01)
*G06T 11/60* (2006.01)
(Continued)

(52) U.S. Cl.
CPC ............ *H04N 5/378* (2013.01); *G06T 5/002* (2013.01); *G06T 11/60* (2013.01); *H04N 1/4092* (2013.01)

(58) Field of Classification Search
CPC ........ G06T 11/60; G06T 5/002; H04N 1/4092
See application file for complete search history.

(56) References Cited

U.S. PATENT DOCUMENTS 8,199,223 B2 * 6/2012 Sasaki .................. G06K 9/6212
348/241
2001/0016082 A1 8/2001 Ichimura
(Continued)

FOREIGN PATENT DOCUMENTS

JP 06-036022 2/1994
JP 08-272960 10/1996
(Continued)

OTHER PUBLICATIONS

Extended European Search Report dated Jul. 20, 2015 in corresponding European Patent Application No. 12883620.2.
(Continued)

*Primary Examiner* — Kim Vu
*Assistant Examiner* — Pinalben Patel
(74) *Attorney, Agent, or Firm* — Staas & Halsey LLP

(57) ABSTRACT

An image conversion apparatus extracts from among pixel rows parallel to an object pixel row, a first pixel row overlapping an aperture shape; and further extracts a second pixel row having the number of pixels successively overlapping the aperture shape equal to or greater than that of the first pixel row. The image conversion apparatus calculates a value of a second pixel in the case of converting an original image, by referring to a storage unit that stores a value of a first pixel in the case of converting the original image. For example, the image conversion apparatus defines an average of the value of the first pixel in the case of converting the original image, a value of a diffusion source pixel (IN[5][2]), and a diffusion source pixel (IN[5][3]) as the value of the second pixel in the case of converting the original image.

7 Claims, 36 Drawing Sheets

(51) Int. Cl.
*G06T 5/00* (2006.01)
*H04N 1/409* (2006.01)

(56) References Cited

U.S. PATENT DOCUMENTS

| | | | |
|---|---|---|---|
| 2008/0118175 A1* | 5/2008 | Rai | G06T 5/20 382/264 |
| 2009/0060387 A1 | 3/2009 | Ricard | |
| 2011/0075905 A1* | 3/2011 | Noshi | A61B 6/032 382/131 |

FOREIGN PATENT DOCUMENTS

| | | |
|---|---|---|
| JP | 2001-216513 | 8/2001 |
| JP | 2004-133551 | 4/2004 |

OTHER PUBLICATIONS

International Search Report mailed Nov. 13, 2012 in corresponding international application PCT/JP2012/071917.

\* cited by examiner

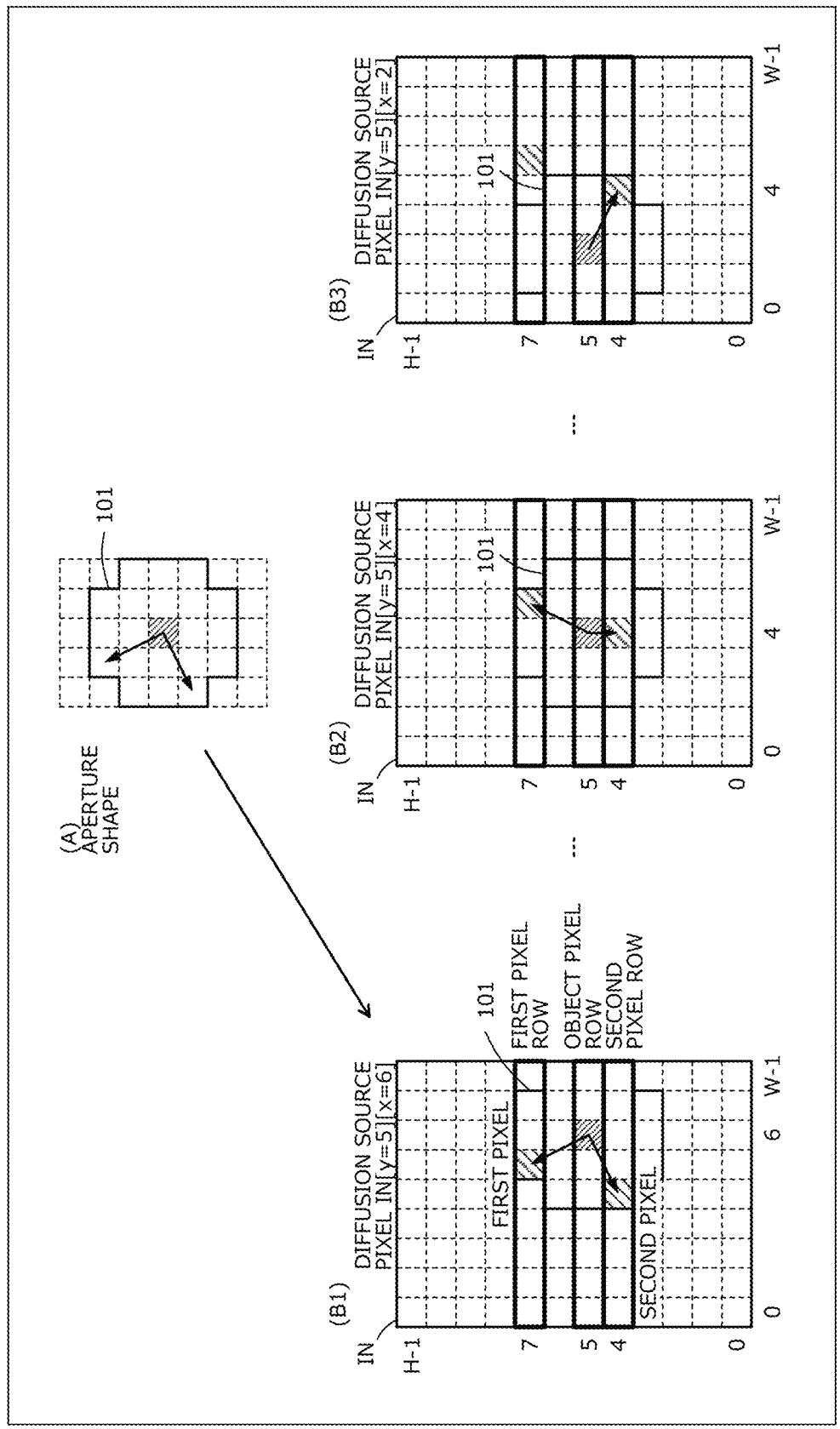

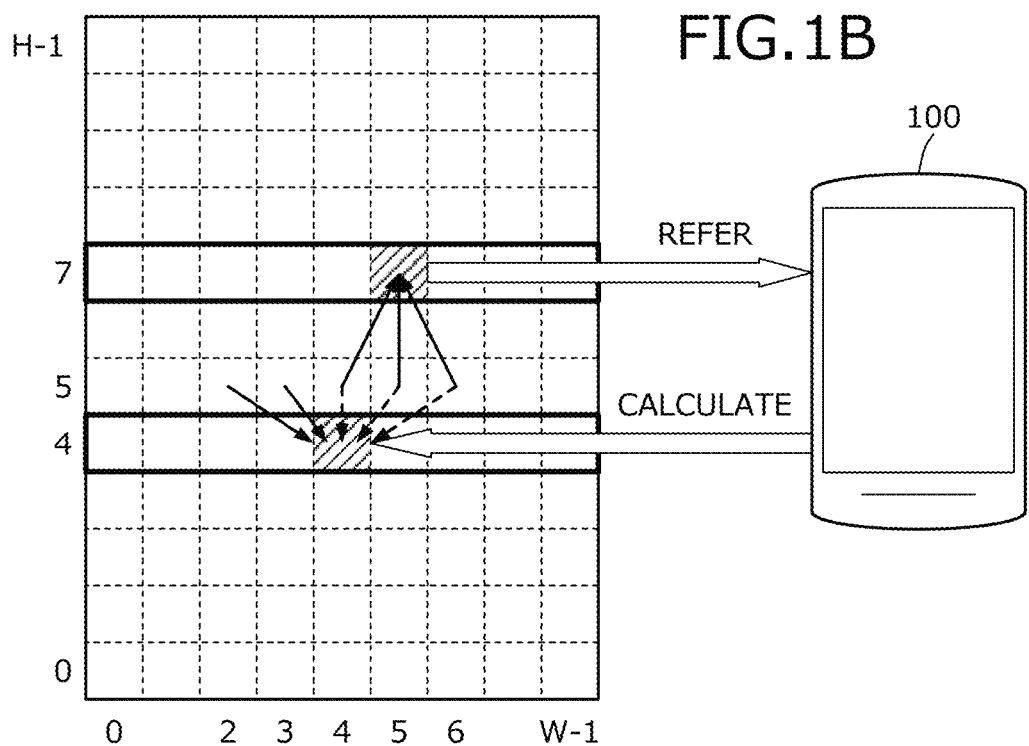

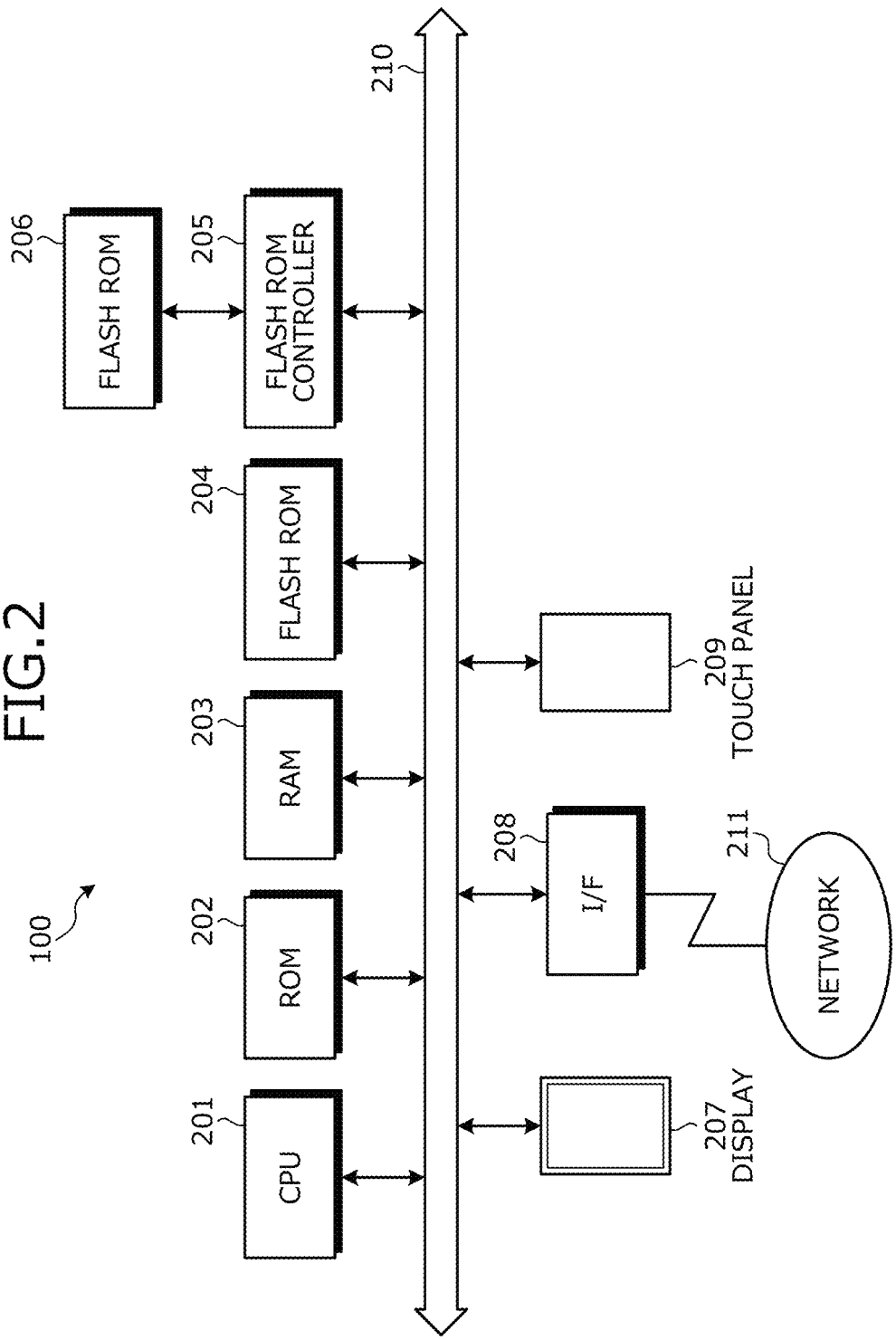

MOVING AVERAGE OF
WIDTH OF ONE

MOVING AVERAGE OF
WIDTH OF TWO

MOVING AVERAGE OF
WIDTH OF THREE

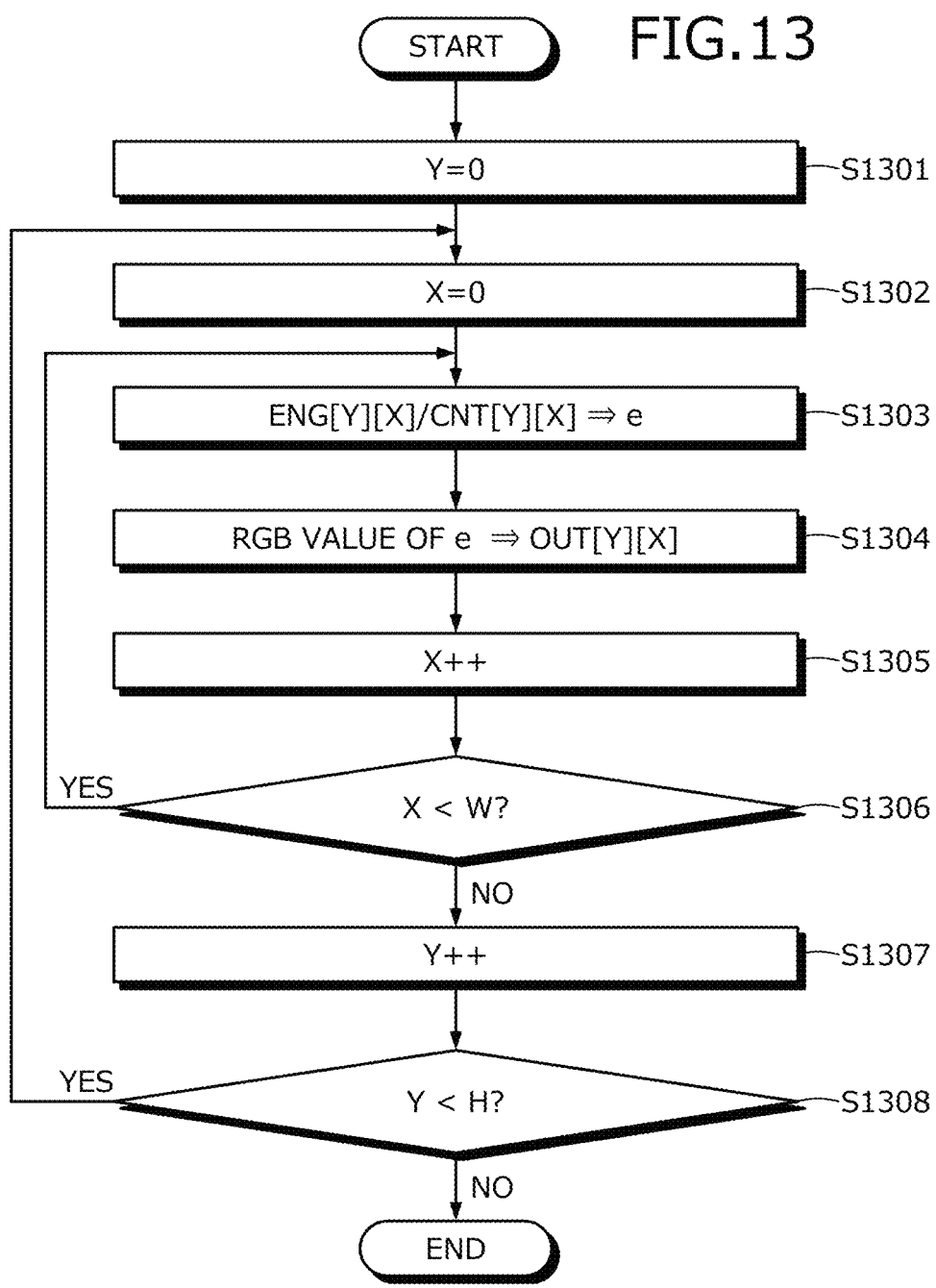

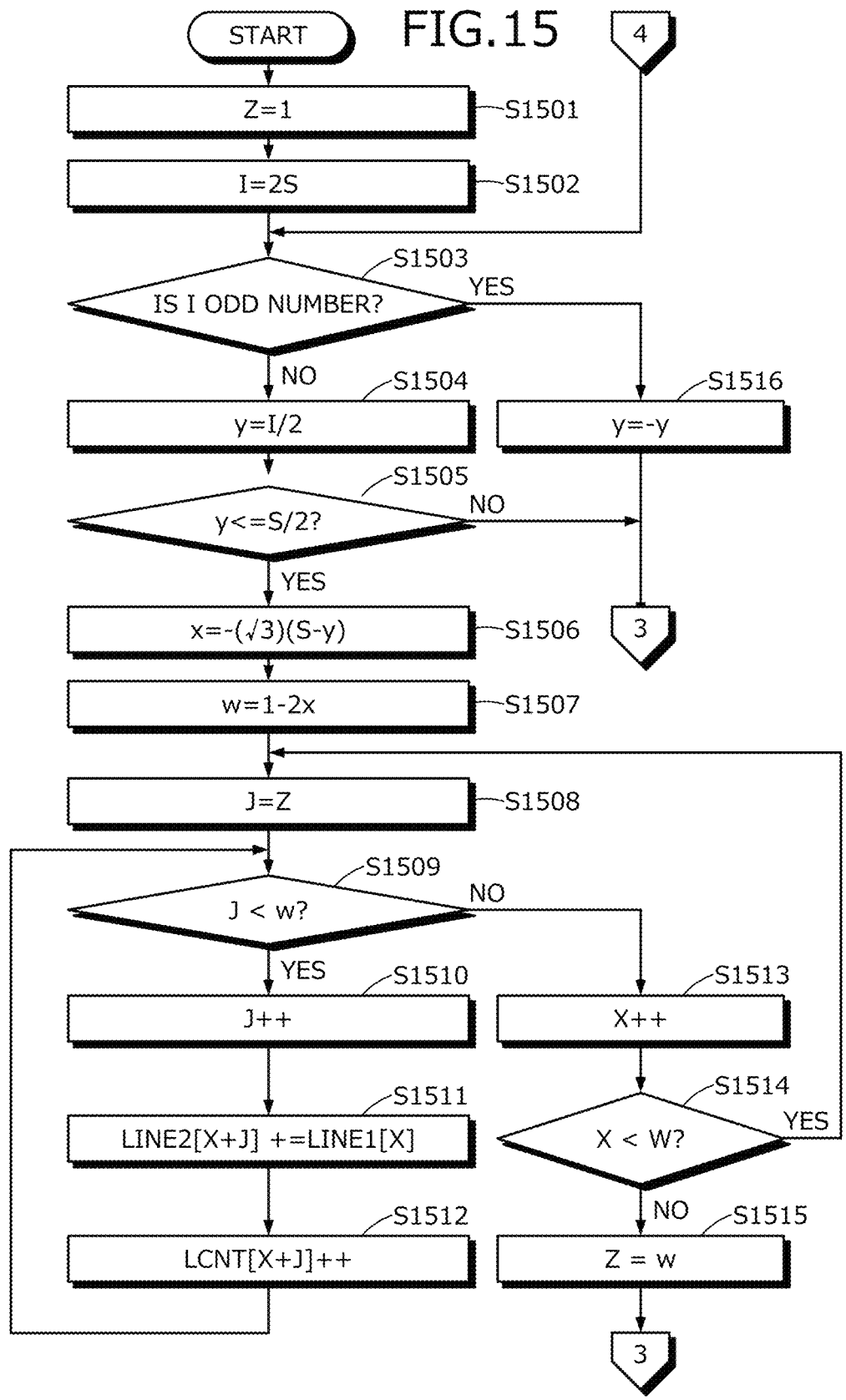

FIG.22A  FIG.22B  FIG.22C
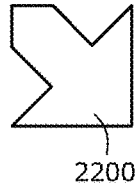
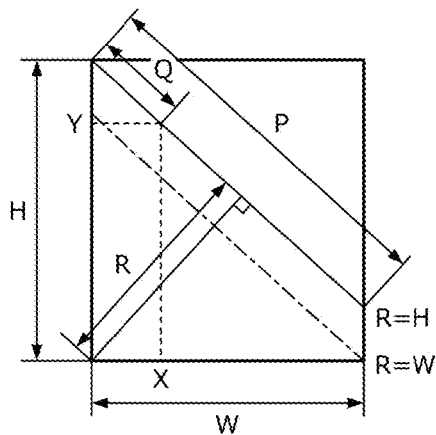
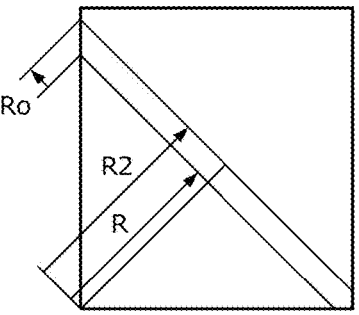
FIG.22D  FIG.22E

IMAGE CONVERSION APPARATUS AND METHOD REDUCING NUMBER OF PIXEL COUNTS PROCESSING

CROSS REFERENCE TO RELATED APPLICATIONS

This application is a continuation application of International Application PCT/JP2012/071917, filed on Aug. 29, 2012 and designating the U.S., the entire contents of which are incorporated herein by reference.

FIELD

The embodiment discussed herein is related to an image conversion program, a recording medium, an image conversion apparatus, and an image conversion method.

BACKGROUND

Techniques of converting an image into an image given a blurring effect has existed. For example, in one technique, to execute a process of giving a blurring effect, a blurring range is calculated for each pixel to be processed in an input image. In another technique, a filter process is executed by using multiple moving average filters of different sizes to generate multiple blurred images, and weight is given to mutually corresponding pixels of the multiple blurred image data for each of the blurred images to use an average value of the blurred image data for a composite blurred image. In a further technique, an exposure amount is obtained by a calculation from an RGB value of each pixel of an input image to execute a process of giving a blurring effect to the exposure amount of each pixel, and the exposure amount of each pixel given the blurring effect is restored to an RGB value (see, e.g., Japanese Laid-Open Patent Publication Nos. H6-036022; 2004-133551; and 2001-216513).

However, the conventional techniques described above is problematic in that the amount of calculation involved in the process of giving a blurring effect to an image becomes large and results in an increase in the processing time consumed for a process of converting an image. For example, the process of giving a blurring effect is a process of distributing values of pixels according to an aperture shape defined as a blurring range for each pixel in an image, leading to a large calculation amount.

SUMMARY

According to an aspect of an embodiment, a non-transitory, computer-readable recording medium stores therein an image conversion program that causes a computer to execute a process that includes extracting, among pixel rows parallel to an object pixel row in an image to be converted, a first pixel row overlapping a region formed of a pixel group within a predetermined range from an given pixel of the object pixel row and a second pixel row having a number of pixels successively overlapping the region equal to or greater than that of the first pixel row; acquiring a pixel count from a pixel at an end in a given direction that is any one among a scanning direction of the object pixel row and a direction opposite to the scanning direction, in a first pixel group included in the region in the extracted first pixel row, to a first pixel included in the first pixel group; identifying a second pixel at a position advanced by the acquired pixel count in a direction opposite to the given direction from the pixel at the end in the given direction in a second pixel group included in the region in the extracted second pixel row; and calculating a value of the second pixel in a case of converting an original image by referring to a storage unit that stores therein a value of the first pixel in the case of converting the image.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is an explanatory diagram (part 1) of an operation example of an image conversion apparatus according to an embodiment;

FIG. 1B is an explanatory diagram (part 2) of an operation example of the image conversion apparatus according to the embodiment;

FIG. 2 is a block diagram of an example of a hardware configuration of the image conversion apparatus;

FIG. 13 is a flowchart of an example of an RGB value conversion process procedure;

FIG. 15 is a flowchart (part 1) of an example of an optical diffusion process procedure without using the aperture shape table;

FIGS. 22A, 22B, 22C, 22D, and 22E are explanatory diagrams of an operation example of the image conversion process in the case of scanning in the y=−X direction;

DESCRIPTION OF EMBODIMENTS

Figure 3:
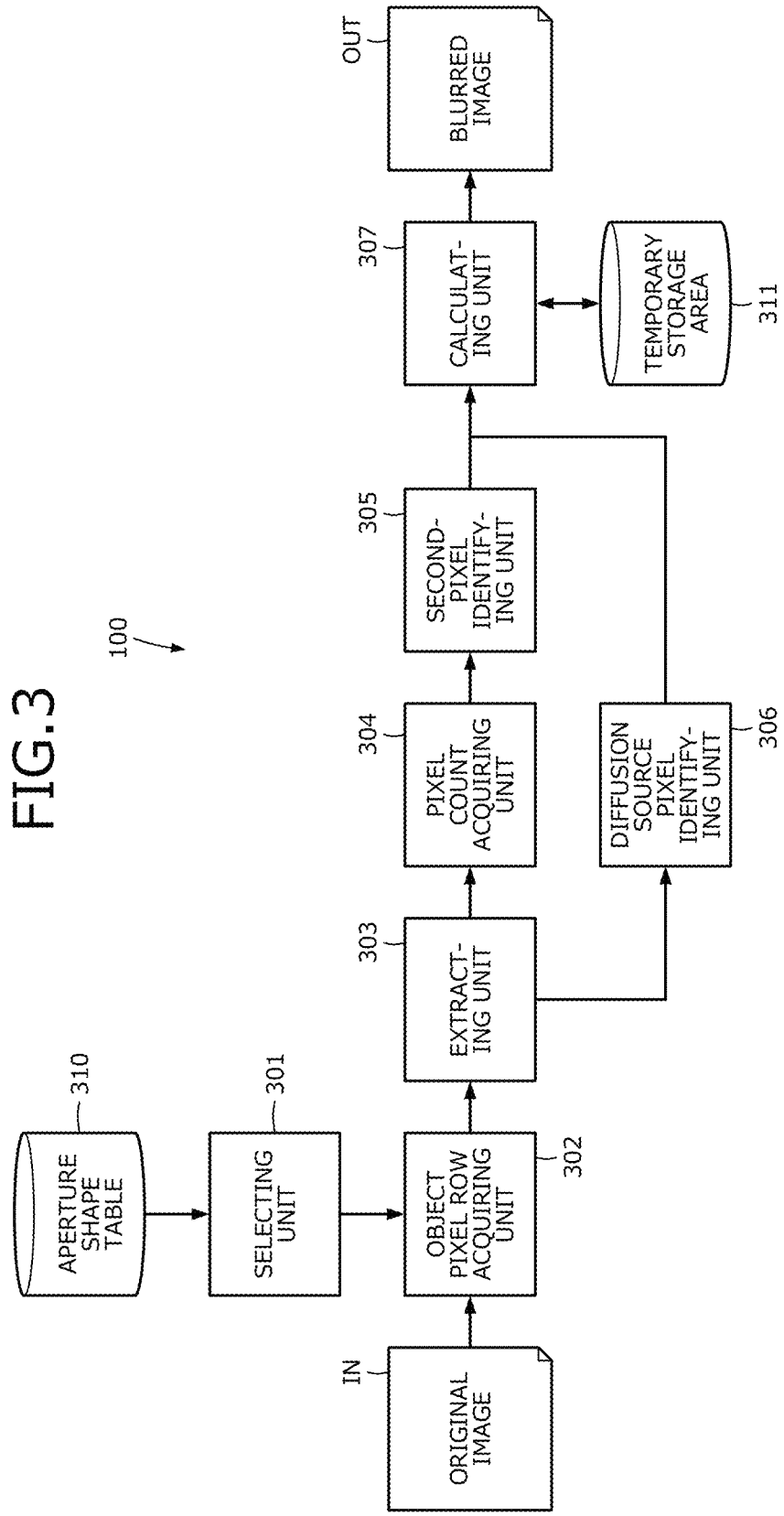
FIG. 3 is a block diagram of an example of a functional configuration of the image conversion apparatus.

Embodiments of an image conversion program, a recording medium, an image conversion apparatus, and an image conversion method will be described in detail with reference to the accompanying drawings.

FIG. 1A is an explanatory diagram (part 1) of an operation example of the image conversion apparatus according to the present embodiment. An image conversion apparatus 100 is a computer receives an original image and executes a process of giving a blurring effect to the original image to convert the original image into a blurred image. For example, the image conversion apparatus 100 is a portable terminal such as a smartphone and a mobile telephone. For example, it is assumed that while the image conversion apparatus 100 is operated by a user, the image conversion apparatus 100 displays popup dialogue. In this case, by blurring the background, exclusive of the popup dialogue, by a blurring effect, the image conversion apparatus 100 can provide a visual effect that draws the attention of the user to the popup dialogue.

However, a process of giving the blurring effect is proportional to a product of the number of pixels in an image and the number of pixels included in an aperture shape, resulting in a large processing amount, and therefore, takes time. The image conversion apparatus 100 according to the present embodiment reduces the processing amount of the process of giving the blurring effect to shorten the processing time.

A process of converting an original image into a blurred image having a blurring effect will be referred to as an "image conversion process". Sizes of the original and blurred images are defined by a vertical width H [in pixels] and a horizontal width W [in pixels]. Reference characters of the original and blurred images are defined as IN and OUT, respectively. The original and blurred images are on two-dimensional orthogonal coordinates with a horizontal axis and a vertical axis defined as an x-axis and a y-axis, respectively. A pixel of x=X and y=Y of the original image is denoted by IN[Y][X] and a pixel of x=X and y=Y of the blurred image after conversion is denoted by OUT[Y][X]. IN[Y] denotes a pixel row on a line of y=Y of the original image, and OUT[Y] denotes a pixel row on a line of y=Y of the blurred image.

(A) of FIG. 1A depicts an aperture shape 101. The aperture shape 101 is an aperture shape specified in advance by a user. The specified aperture shape 101 is a shape of a region formed of a pixel group within a predetermined range from a diffusion source pixel. A pixel of x=0 and y=0 at the center of the aperture shape 101 is defined as the diffusion source pixel with a value of the pixel diffused to a pixel group within a predetermined range. The value of the pixel may be an RGB value or an optical energy value indicative of an exposure amount converted from the RGB value. The optical energy value is a value obtained by multiplying illuminance by time.

The pixel group within the predetermined range depicted in FIG. 1A is made up of pixels satisfying $-1 \leq x \leq 1$ in the lines of y=2, −2 and pixels satisfying $-2 \leq x \leq 2$ in the lines of y=1, 0, 1. Therefore, the pixel group included in the aperture shape is made up of 21 [pixels]. If the number of pixels of a screen of the image conversion apparatus 100 is 320 [pixels]×480 [pixels], the product of the number of pixels in an image and the number of pixels included in the aperture shape is 320×480×21=3225600 [pixels]. The image conversion apparatus 100 according to the present embodiment achieves a reduction in calculation amount of a blurring process.

(B1) to (B3) of FIG. 1A depict which pixel affects pixels overlapping with a blurring shape. In (B1) to (B3) of FIG. 1A, y=5 is an object pixel row of the diffusion source pixel diffusing light, acquired by the image conversion apparatus 100 scanning an input image in a horizontal direction in the following description. The scanning direction may be an x-axis direction, a y-axis direction, or a diagonal direction different from the x-axis direction and the y-axis direction.

The image conversion apparatus 100 extracts a pixel row of y=7 as a first pixel row that overlaps the aperture shape 101 among the pixel rows parallel to the object pixel row. The image conversion apparatus 100 further extracts a pixel row of y=4 as a second pixel row having a number of pixels successively overlapping the aperture shape 101 equal to or greater than that of the first pixel row. For example, the number of pixels of the first pixel row overlapping the aperture shape 101 is 3 [pixels] while the number of pixels of the second pixel row overlapping the aperture shape 101 is 5 [pixels]. The number of pixels overlapping the aperture shape 101 in a pixel row in the scanning direction will hereinafter be referred to as a "blur amount".

In (B1) of FIG. 1A, if the diffusion source pixel of the object pixel row is set to IN[5][6], the image conversion apparatus 100 selects IN[7][5] as a first pixel out of the pixel row of y=7. The image conversion apparatus 100 further identifies IN[4][4] as a second pixel out of the pixel row of y=4. In the positional relationship between the first pixel and the second pixel, the pixels are at the same relative positions in the region overlapping the aperture shape. In particular, in a first pixel group overlapping the aperture shape 101 at y=7, IN[7][5] is located at 0th position counted in the direction opposite to the scanning direction. Similarly, in a second pixel group overlapping the aperture shape 101 at y=4, IN[4][4] is located at 0th position counted in the direction opposite to the scanning direction. The relative positions in the region may be viewed in the scanning direction. Since both the first pixel and the second pixel are included in the aperture shape 101, the first pixel and the second pixel are affected by the diffusion source pixel IN[5][6].

In (B2) of FIG. 1A, if the diffusion source pixel of the object pixel row is set to IN[5][4], both the first pixel and the second pixel are included in the aperture shape 101 and therefore, the first pixel and the second pixel are affected by the diffusion source pixel IN[5][4]. Although not depicted, if the diffusion source pixel of the object pixel row is set to IN[5][5], both the first pixel and the second pixel are included in the aperture shape 101 and therefore, the first pixel and the second pixel are affected by the diffusion source pixel IN[5][5].

Subsequently, in (B3) of FIG. 1A, if the diffusion source pixel of the object pixel row is set to IN[5][2], the second pixel is included in the aperture shape 101 and therefore, the second pixel is affected by the diffusion source pixel IN[5][2]. However, the first pixel is not included in the aperture shape 101 and therefore, the first pixel is not affected by the diffusion source pixel IN[5][2]. Although not depicted, if the diffusion source pixel of the object pixel row is set to IN[5][3], the second pixel is included in the aperture shape 101 and therefore, the second pixel is affected by the diffusion source pixel IN[5][3]. However, the first pixel is not included in the aperture shape 101 and therefore, the first pixel is not affected by the diffusion source pixel IN[5][3].

Consequently, the first pixel is affected by the diffusion source pixels IN[5][4] to IN[5][6]. The second pixel is affected by the diffusion source pixels IN[5][2] to IN[5][6]. Therefore, a portion of the affecting pixels is common to the first and second pixels and thus, the calculation result can be reused. The number of affected pixels coincides with the blur amount. The reuse of the calculation result will be described with reference to FIG. 1B.

FIG. 1B is an explanatory diagram (part 2) of an operation example of the image conversion apparatus according to the present embodiment. As described with reference to FIG. 1A, a portion of the affecting pixels is common to the first and second pixels. Therefore, the image conversion apparatus 100 refers to a storage unit that stores a value of the first pixel in the case of converting the original image IN and calculates a value of the second pixel in the case of converting the original image IN. For example, the image conversion apparatus 100 defines an average of a value of the first pixel in the case of converting the original image IN, a value of the diffusion source pixel IN[5][2], and a value of the diffusion source pixel IN[5][3], as a value of the second pixel in the case of converting the original image IN.

If the image conversion apparatus 100 does not refer to the value of the first pixel in the case of converting the original image IN, the image conversion apparatus 100 executes four addition processes for adding the diffusion source pixels IN[5][2] to IN[5][6]. On the other hand, by referring to the value of the first pixel in the case of converting the original image IN, the image conversion apparatus 100 only needs to execute two addition processes. The operation of the image conversion apparatus 100 will hereinafter be described in detail with reference to FIGS. 2 to 36.

FIG. 2 is a block diagram of an example of a hardware configuration of the image conversion apparatus. In FIG. 2, the image conversion apparatus 100 is assumed to be a portable terminal such as a smartphone and has a CPU 201, read only memory (ROM) 202, random access memory (RAM) 203, flash ROM 204, a flash ROM controller 205, and flash ROM 206. The image conversion apparatus 100 also has a display 207, an I/F 208, and a touch panel 209. The units are connected to each other by a bus 210.

The CPU 201 is a control apparatus responsible for general control of the image conversion apparatus 100. The ROM 202 is nonvolatile memory that stores programs such as a boot program. The RAM 203 is volatile memory used as a work area of the CPU 201. The flash ROM 204 is rewritable nonvolatile memory and is, for example, NOR flash memory with a high read-out speed. The flash ROM 204 stores system software such as an operating system (OS) and application software. For example, when the OS is updated, the image conversion apparatus 100 receives a new OS through the I/F 208 and updates the old OS stored in the flash ROM 204 to the received new OS. An image conversion program according to the present embodiment may be present in the flash ROM 204 as a system call that is called by the OS.

The flash ROM controller 205 is a control apparatus that controls the reading and writing of data with respect to the flash ROM 206, under the control of the CPU 201. The flash ROM 206 is a rewritable nonvolatile memory and is NAND flash memory for the main purpose of storage and transportation of data, for example. The flash ROM 206 stores data written thereto under the control of the flash ROM controller 205. Specific examples of data are image data and video data obtained through the I/F 208 by a user using the image conversion apparatus 100, and the image conversion program according to the present embodiment may be stored. For example, a memory card or an SD card can be employed as the flash ROM 206.

The display 207 displays a cursor, icons, and/or tool boxes as well as data such as documents, images, and functional information. For example, a TFT liquid crystal display can be employed as the display 207.

The I/F 208 is connected through a communication line to a network 211 such as a local area network (LAN), a wide area network (WAN), and the Internet, and is connected via the network 211 to another apparatus. The I/F 208 is responsible for an internal interface with the network 211 and controls the input and output of data with respect to an external apparatus. For example, a modem or a LAN adapter can be employed as the I/F 208. The touch panel 209 is an apparatus that inputs data through contact by a user.

Functions of the image conversion apparatus 100 will be described. FIG. 3 is a block diagram of an example of a functional configuration of the image conversion apparatus. The image conversion apparatus 100 includes a selecting unit 301, an object pixel row acquiring unit 302, an extracting unit 303, a pixel count acquiring unit 304, a second-pixel identifying unit 305, a diffusion source pixel identifying unit 306, and a calculating unit 307. With regard to the selecting unit 301 to the calculating unit 307 acting as a control unit, functions of the selecting unit 301 to the calculating unit 307 are implemented by executing on the CPU 201, the programs stored in a storage device. For example, the storage device is the ROM 202, the RAM 203, the flash ROM 204, and the flash ROM 206 depicted in FIG. 2. The functions of the selecting unit 301 to the calculating unit 307 may be implemented by another CPU executing the program via the I/F 208.

The image conversion apparatus 100 can access an aperture shape table 310 and a temporary storage area 311. The aperture shape table 310 is a storage area that stores a shape of a region formed of a pixel group within a predetermined range from a given pixel and a scanning direction in a correlated manner. The temporary storage area 311 is a storage area temporarily storing a value of a pixel of the image OUT converted from the original image IN. The aperture shape table 310 and the temporary storage area 311 are stored in the storage device such as the RAM 203, the flash ROM 204, and the flash ROM 206.

The selecting unit 301 refers to the aperture shape table 310 and selects a scanning direction corresponding to a specified aperture shape. The aperture shape is specified by a user, for example. Alternatively, the aperture shape may be specified by a developer. The aperture shape may be any shape, for example, a hexagonal shape, a heart shape, and a star shape. For example, if the aperture shape specified by a user is a hexagonal aperture shape, the selecting unit 301 selects the x-axis direction as the scanning direction stored in the aperture shape table 310. The selected data is stored in the storage device such as the RAM 203, the flash ROM 204, and the flash ROM 206.

The object pixel row acquiring unit 302 acquires an object pixel row by scanning in the scanning direction selected by the selecting unit 301. For example, it is assumed that the selecting unit 301 selects the x-axis direction as the scanning direction. In this case, the object pixel row acquiring unit 302 selects a pixel row of y=5 as the object pixel row out of the original image IN by scanning in the x-axis direction. The object pixel row acquiring unit 302 may repeatedly acquire the object pixel row. For example, the object pixel row acquiring unit 302 may acquire pixel rows from y=0 to Y=H−1 as the object pixel rows.

The extracting unit 303 extracts a first pixel row that overlaps a region formed of a pixel group within a predetermined range from an given pixel of the object pixel row and a second pixel row having a number of pixels that overlap the region, equal to or greater than that of the first pixel row, among pixel rows parallel to the object pixel row in an image to be converted. The given pixel is a diffusion source pixel for a value of a pixel. In the example of FIG. 1, the diffusion source pixel is IN[y=5][x=6]. For example, the extracting unit 303 extracts a pixel row of y=7 as the first pixel row overlapping the aperture shape 101 and a pixel row of y=4 as the second pixel row having a number of pixels overlapping the aperture shape 101, equal to or greater than that of the first pixel row, among the pixel rows parallel to a pixel row of y=5.

The pixel count acquiring unit 304 acquires the number of pixels from a pixel at an end, in a given direction of either the scanning direction of the object pixel row or the direction opposite to the scanning direction, in the first pixel group included in the region in the first pixel row extracted by the extracting unit, to the first pixel included in the first pixel group. For example, it is assumed that the selecting unit 301 selects the x-axis direction as the scanning direction. In the example of FIG. 1A, the first pixel group is from IN[y=5][x=5] to IN[y=5][x=7]. The second pixel group is from IN[y=4][x=4] to IN[y=4][x=8]. The first pixel may be any pixel in the first pixel group. The first pixel is assumed to be IN[y=7][x=5] in this description.

If the scanning direction is the x-axis direction, the given direction may be the positive x-axis direction or the negative x-axis direction. For example, the pixel count acquiring unit 304 acquires zero as the number of pixels from the pixel IN[y=7][x=5] at the end in the negative x-axis direction to the first pixel IN[y=7][x=5] in the first pixel group. The acquired number of pixels is stored in the storage device such as the RAM 203, the flash ROM 204, and the flash ROM 206.

The second-pixel identifying unit 305 identifies the second pixel at a position advanced by the pixel count acquired by the pixel count acquiring unit 304 in the direction opposite to the given direction from the pixel at the end in the given direction in the second pixel group included in the region in the second pixel row. For example, the second-pixel identifying unit 305 identifies the second pixel IN[y=4][x=4] at a position advanced by the pixel count of zero in the positive x-axis direction from the pixel IN[y=4][x=4] at the end in the negative x-axis direction in the second pixel group. The positions of x- and y-coordinates of the identified second pixel are stored in the storage device such as the RAM 203, the flash ROM 204, and the flash ROM 206.

The diffusion source pixel identifying unit 306 identifies from the object pixel row, a pixel that overlaps the given pixel after movement when the given pixel is moved parallel to the object pixel row. When moving the given pixel, the diffusion source pixel identifying unit 306 moves the given pixel such that the first pixel is included in a region formed of the pixel group within the predetermined range from the given pixel after movement when the given pixel is moved parallel to the object pixel row. For example, the diffusion source pixel identifying unit 306 moves the diffusion source pixel such that the first pixel IN[y=4][x=4] is included in the aperture shape 101 in y=5 defined as the object pixel row. The diffusion source pixel identifying unit 306 identifies the pixels IN[5][4] to IN[5][6] that overlap the given pixel.

The diffusion source pixel identifying unit 306 identifies from the object pixel row, a pixel that overlaps the given pixel after movement when the given pixel is moved parallel to the object pixel row. When moving the given pixel, the diffusion source pixel identifying unit 306 moves the given pixel such that the second pixel is included in a region formed of the pixel group within the predetermined range from the given pixel after movement when the given pixel is moved parallel to the object pixel row. The positions of x- and y-coordinates of the identified pixels are stored in the storage device such as the RAM 203, the flash ROM 204, and the flash ROM 206.

The calculating unit 307 calculates a value of the second pixel in the case of converting the original image IN, by referring to the temporary storage area 311 that store a value of the first pixel in the case of converting an image. For example, it is assumed that when the given pixel is moved such that the first pixel is included, a pixel group identified by the diffusion source pixel identifying unit 306 coincides with a pixel group identified when the given pixel is moved such that the second pixel is included. In this case, the calculating unit 307 sets the value of the first pixel stored in the temporary storage area 311 as the value of the second pixel in the case of converting the original image IN.

The calculating unit 307 may calculate the value of the first pixel in the case of converting the original image IN, based on a value of a pixel identified by the diffusion source pixel identifying unit 306. For example, the calculating unit 307 adds the values of the diffusion source pixels IN[5][4] to IN[5][6] to calculate the value of the first pixel OUT[7][5] acquired by converting the original image IN.

The calculating unit 307 may calculate the value of the second pixel in the case of converting the image, based on the value of the first pixel calculated by the calculating unit 307. The calculating unit 307 may calculate value of the second pixel in the case of converting the image, based on the value of the first pixel in the case of converting the original image IN and a value of an identified pixel. For example, the calculating unit 307 adds the value of the first pixel OUT[7][5], the value of the diffusion source pixel IN[4][2], and the value of the diffusion source pixel IN[5][3] to calculate the second pixel OUT[4][4].

The calculating unit 307 calculates, for each of the respective pixels of the object pixel row, a value of each of the respective pixels related to the first pixel row in the case of converting the image, based on values of pixels from each of the respective pixels to a pixel advanced by the pixel count of the first pixel group in the given direction. For example, the calculating unit 307 calculates, for each of the respective pixels of the object pixel row of y=5, a value of each of the respective pixels related to the first pixel row in the case of converting the image. The calculating unit 307 makes the calculation by adding the values of three pixels corresponding to the pixel count of the first pixel group, from each of the respective pixels in the negative x-axis direction.

In particular, for example, the calculating unit 307 defines the addition result of values of IN[y=5][x=0] to IN[y=5][x=2] as a value of TMP[x=2] as the temporary storage area 311. The calculating unit 307 further defines the addition result of values of IN[y=5][x=1] to IN[y=5][x=3] as TMP[x=3]. The calculating unit 307 performs such a calculation until TMP[x=W−1+S]. S is the maximum value of the blur amount. The calculated results are stored in the temporary storage area 311.

Among the calculated values of the respective pixels related to the first pixel row, the calculating unit 307 sets, as a value of the first pixel, a value of the pixel at a position advanced, from the given pixel in the direction opposite to the given direction, by the number of pixels from the pixel at the end in the given direction in the first pixel group to the first pixel.

It is assumed that the first pixel group is IN[y=5][x=5] to IN[y=5][x=7], that the given direction is the negative x-axis direction, and that the first pixel is IN[y=5][x=5]. In this case, the number of pixels from the pixel at the end in the given direction in the first pixel group to the first pixel is zero. Among TMP[x=0] to TMP[x=W−1+S], the calculating unit 307 sets, as the value of the first pixel acquired by converting the original image, the value of the pixel TMP[x=6] at the position of the pixel count of zero from the given pixel in the positive x-axis direction from IN[y=5][x=6].

The calculating unit 307 may calculate, for each of the respective pixels, a value of each of the respective pixels related to the second pixel row in the case of converting the image based on the following information. The information is values of pixels from the next pixel subsequent to the pixel at a position advanced from each of the respective pixels by the pixel count of the first pixel group in the given direction, and the calculated values of the respective pixels related to the first pixel row.

The calculating unit 307 further calculates a value of the second pixel in the case of converting the original image, among the calculated values of the respective pixels related to the second pixel row. This calculation is based on the information that is the value of the pixel at a position advanced from the given pixel in the direction opposite to the given direction by the number of pixels from the pixel at the end in the given direction in the first pixel group to the second pixel. The calculated value of the pixel is stored in the temporary storage area 311. The image conversion process in the case of scanning in the x-axis direction will be described with reference to FIGS. 4 to 16.

Figure 4:
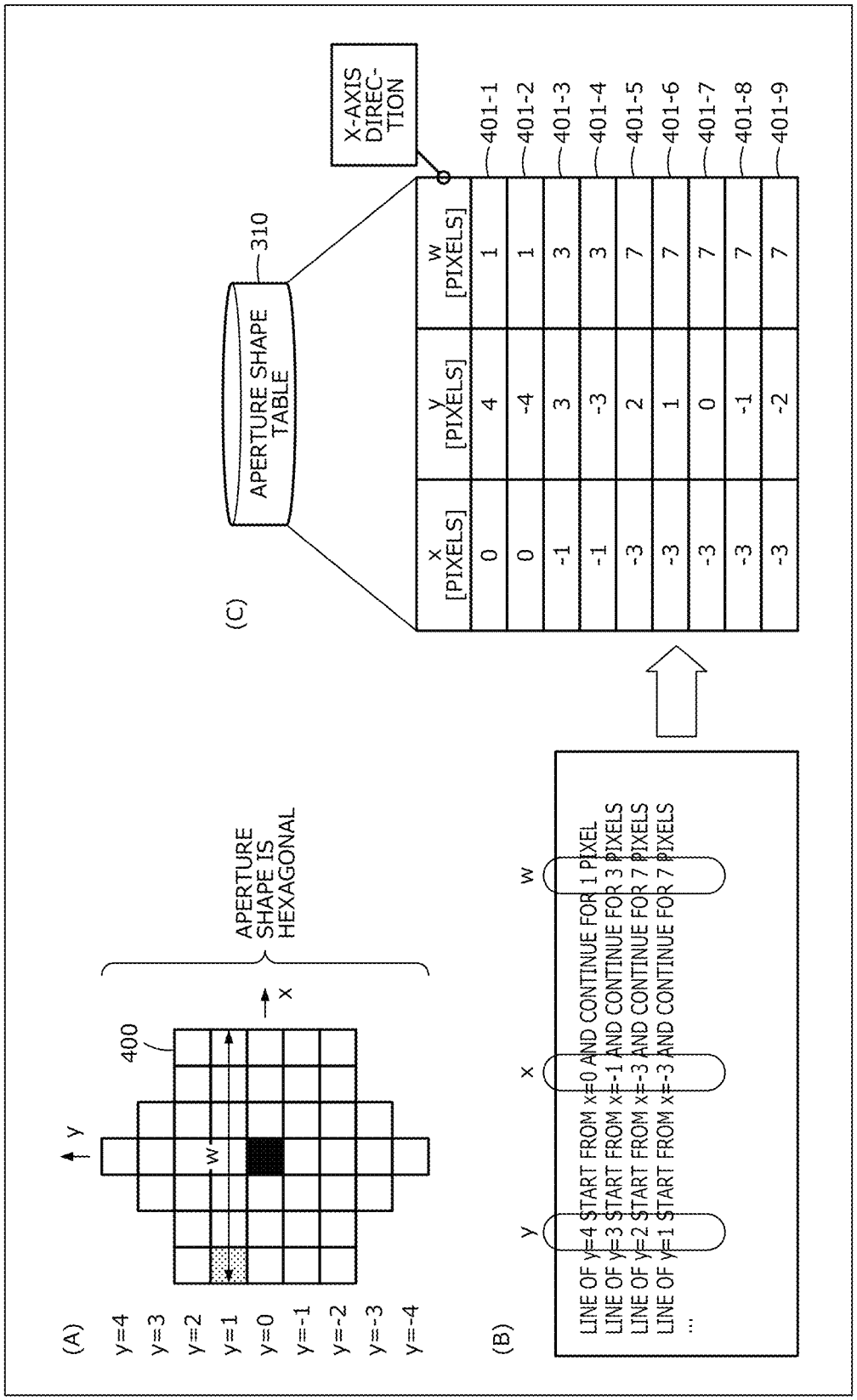
FIG. 4 is an explanatory diagram of a first example of an aperture shape and a first example of storage contents of an aperture shape table.

FIG. 4 is an explanatory diagram of a first example of an aperture shape and a first example of storage contents of the aperture shape table. (A) of FIG. 4 depicts an aperture shape 400 on the x-y plane. As depicted in FIG. 4, the aperture shape 400 is hexagonal. In (A) of FIG. 4, w denotes the blur amount. In (B) of FIG. 4, specific numeric values of the aperture shape 400 are described in the case of scanning in the x-direction. For example, a line of y=4 starts from x=0 and continues for w=1 pixel. A line of y=3 starts from x=−1 and continues for w=3 pixels. A line of y=2 starts from x=−3 and continues for w=7 pixels.

(C) of FIG. 4 depicts an example of storage contents when the specific numeric values of the aperture shape 400 are stored in the aperture shape table. The aperture shape table 310 depicted in (C) of FIG. 4 stores records 401-1 to 401-9. The aperture shape table 310 stores the x-axis direction as the scanning direction in a correlated manner. The aperture shape table 310 includes three types of fields of x, y, and w. The x-field stores a position in an x-line of the pixel at the left end that is a blur start position in a corresponding y-line of the aperture shape 400. The y-field stores a position of the pixel in the corresponding y-line. The w-field stores the number of pixels from the left end to the right end in the corresponding y-line, which is defined as the blur amount. The aperture shape table 310 stores the contents in ascending order of w.

For example, the record 401-1 indicates that the line of y=4 starts from x=0 and continues for one pixel. An operation example of the image conversion process will be described with reference to FIGS. 5 to 7.

Figure 5:
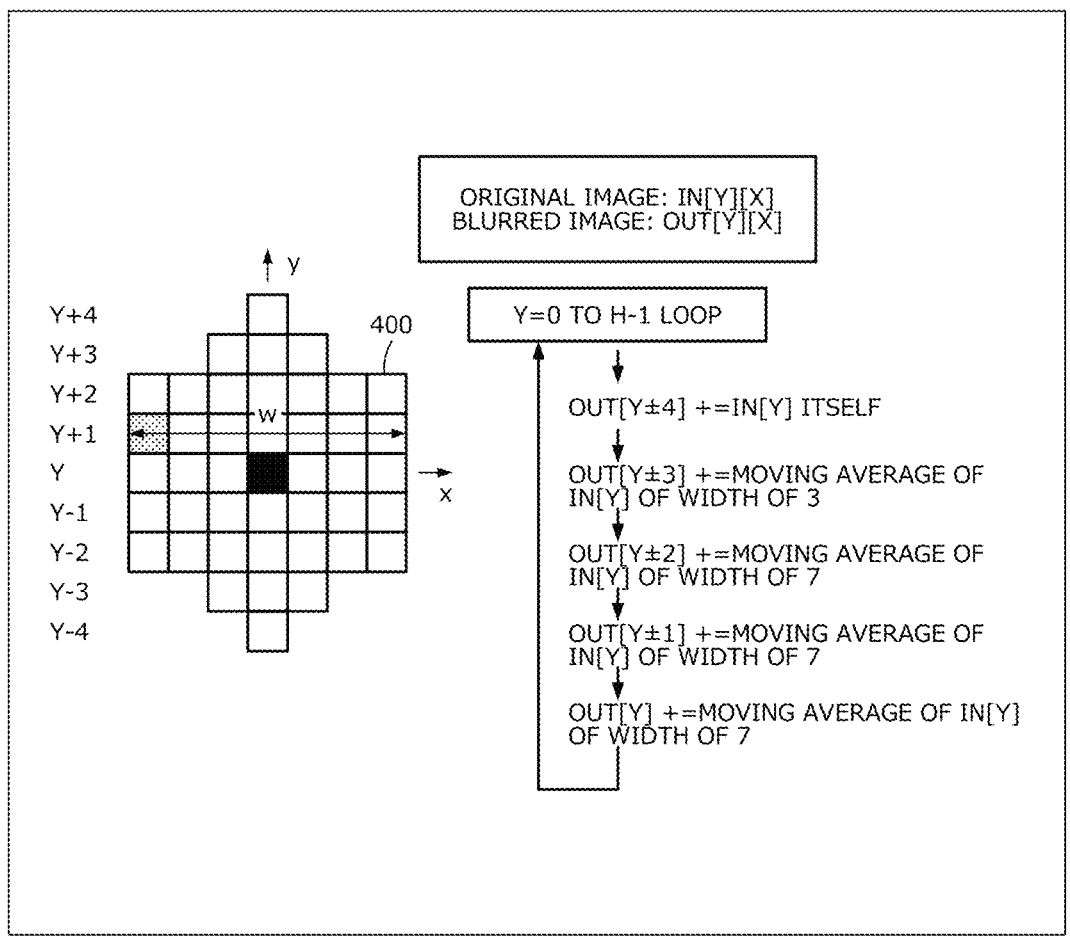
FIG. 5 is an explanatory diagram (part 1) of an operation example of an image conversion process.

FIG. 5 is an explanatory diagram (part 1) of an operation example of the image conversion process. FIG. 5 is a diagram for explaining which pixel in a pixel group after conversion is affected by a certain pixel in the original image. For example, in the example of FIG. 5, pixels affected by pixels of IN[Y] defined as the process object line out of IN[0] to IN[H−1] will be described.

IN[Y][X] affects OUT[Y+4][X]. Similarly, IN[Y][X+1] affects OUT[Y+4][X+1], and IN[Y][X+2] affects OUT[Y+4][X+2]. As described above, IN[Y] itself may be added to OUT[Y+4]. In the same way, IN[Y] itself may be added to OUT[Y−4]. It is noted that "±" of FIG. 5 is a sign for describing the same two values with different signs in an abbreviated manner. It is also noted that "+=" is an operator for adding the right side to the left side and storing the addition result as the right side.

IN[Y][X] affects three pixels OUT[Y+3][X−1], OUT[Y+3][X], and OUT[Y+3][X+1]. Similarly, IN[Y][X−1] affects three pixels OUT[Y+3][X−2], OUT[Y+3][X−1], and OUT[Y+3][X]. Similarly, IN[Y][X+1] affects three pixels OUT[Y+3][X], OUT[Y+3][X+1], and OUT[Y+3][X+2].

As described above, OUT[Y+3][X] is affected by three pixels IN[Y][X−1], IN[Y][X], and IN[Y][X+1]. When this is generalized by using i taking a value from 0 to W−1, a pixel OUT[Y+3][i] is affected by three pixels IN[Y][i−1], IN[Y][i], and IN[Y][i+1]. Therefore, OUT[Y+3] has the blur amount of three and a moving average of IN[Y] of a width of three may be added thereto. A method of generating a moving average will be described later with reference to FIGS. 6A to 6C. Similarly, a moving average of IN[Y] of a width of three may be added to OUT[Y−3]. Similarly, a moving average of IN[Y] of a width of seven may be added to OUT[Y±2], OUT[Y±1], and OUT[Y].

Figure 6A:
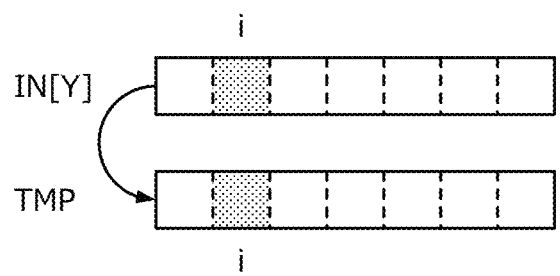
FIGS. 6A, 6B, and 6C are explanatory diagrams (part 2) of the operation example of the image conversion process.
Figure 6B:
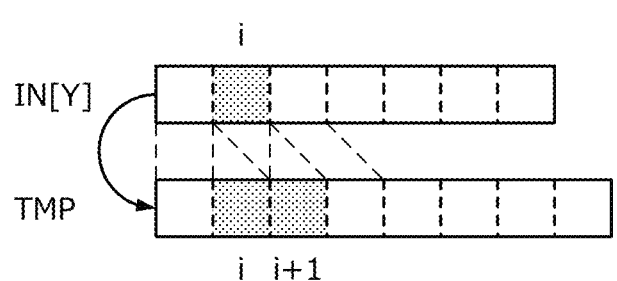
Figure 6C:
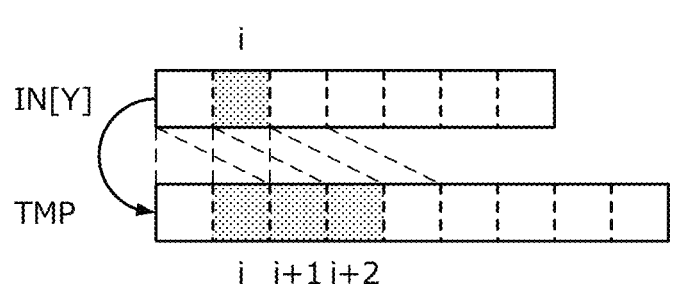

FIGS. 6A, 6B, and 6C are explanatory diagrams (part 2) of the operation example of the image conversion process. FIGS. 6A to 6C depict a method of generating a moving average when IN[Y] is the process object and a process result is stored in TMP acting as the temporary storage area 311.

FIG. 6A depicts a moving average of the width of one. The moving average of the width of one is the same as the source data. For example, when using i taking a value from 0 to W−1, TMP[i] stores a value of IN[Y][i]. FIG. 6B depicts a moving average of the width of two. For example, the image conversion apparatus 100 adds a value of the next pixel in the object row of the original image to TMP storing the moving average of the width of one to generate the moving average of the width of two. For example, the image conversion apparatus 100 adds a value of IN[Y][i] to TMP[i+1] storing the moving average of the width of one. FIG. 6C depicts a moving average of the width of three. For example, the image conversion apparatus 100 adds a value of IN[Y][i] to TMP[i+2] storing the moving average of the width of two.

As a result, TMP[i+2] is an average value of the three pixels IN[Y][i+1], and IN[Y][i+2]. Similarly, TMP[i+1] is an average value of the three pixels IN[Y] [i−1], IN[Y] [i], and IN[Y] [i+1], and TMP[i] is an average value of the three pixels IN[Y][i−2], IN[Y][i−1], and IN[Y][i]

In the same way, the image conversion apparatus 100 generates the moving averages in the widths of four, five, six, and seven. A moving average in a large width can be obtained by using a moving average in a small width. When a moving average in a large width is obtained by using a moving average in a small width, the calculation amount can be made smaller than the calculation amount when values of pixels are successively added. For example, the moving average of the width of seven needs only four calculations if the moving average of the width of three is already generated.

Therefore, in the case of the moving average described with reference to FIGS. 6A to 6C, TMP[i] is an average value of the three pixels IN[Y][i−2], IN[Y][i−1], and IN[Y][i]. As described above, TMP[i] obtained in FIGS. 6A to 6C is an average value of a value of the pixel with the same x-coordinate, an adjacent pixel in the negative x-axis direction, and a next adjacent pixel. To simplify the process of the moving average, the moving average described with reference to FIGS. 6A to 6C is obtained by successively adding the adjacent pixel in the positive x-axis direction each time the width of the moving average increases. The process of successively adding the adjacent pixel in the positive x-axis direction has simple process contents as compared to a process of adding an adjacent pixel in the positive direction and then adding an adjacent pixel in the negative direction.

In FIG. 5, however, it is described that the moving average added to the pixel OUT[Y+3][i] is the moving average of IN[Y] [i−1], IN[Y] [i], and IN[Y] [i+1], i.e., a value of a pixel at the same x-coordinate and the adjacent pixels on the both sides of the pixel at the same x-coordinate in the x-axis direction. As described above, the pixels affecting the pixel OUT[Y+3][i] are shifted from the pixels affecting TMP[i] between FIGS. 5 and 6. To achieve a consistent state, when adding TMP to the pixel OUT[Y+3][i], the image conversion apparatus 100 shifts and adds TMP. An example an operation of adding TMP will be described with reference to FIG. 7.

Figure 7:
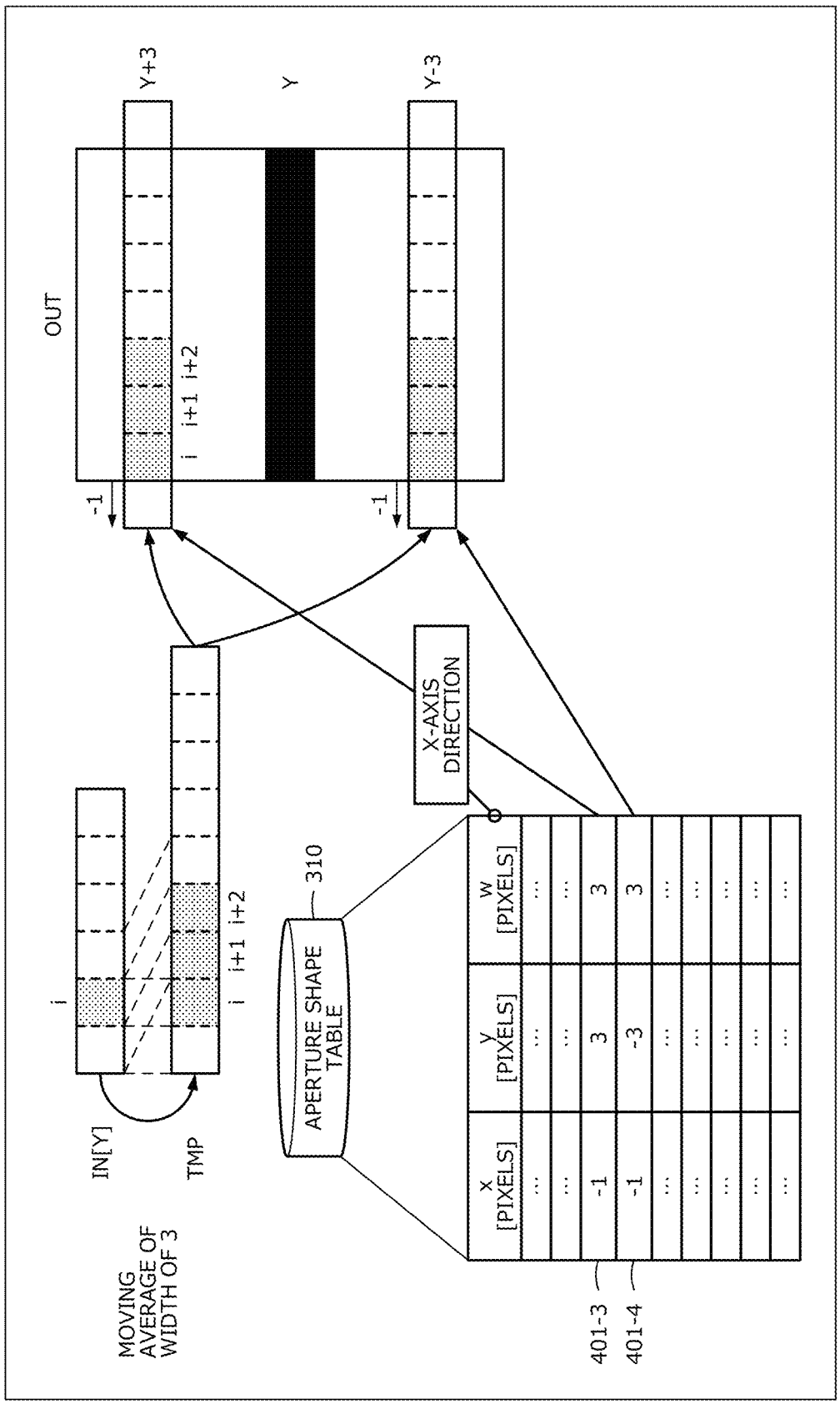
FIG. 7 is an explanatory diagram (part 3) of the operation example of the image conversion process.

FIG. 7 is an explanatory diagram (part 3) of the operation example of the image conversion process. FIG. 7 depicts an example of adding the moving average TMP in the width of three. The image conversion apparatus 100 refers to the record 401-3 with the width of three in the aperture shape table 310 and adds the values of the pixels of TMP to OUT[Y+3]. In this case, the image conversion apparatus 100 adds TMP with an offset of −1 pixel that is a value in the x-field of the record 401-3. For example, the image conversion apparatus 100 adds the value of TMP[i+1] to OUT[Y+4][i]. From the description of FIGS. 6A to 6C, TMP[i+1] is an average value of the three pixels IN[Y][i−1], IN[Y][i], and IN[Y][i+1] and therefore, this means that the moving average described with reference to FIG. 5 can be added.

Subsequently, the image conversion apparatus 100 adds the values of the pixels of TMP to OUT[Y−3]. As described above, if a moving average of a certain width is added to multiple lines, the image conversion apparatus 100 adds a result of the moving average of the certain width to the multiple lines and therefore can make a calculation amount smaller than the method of adding affecting pixels for each pixel. A flowchart of the operation described with reference to FIGS. 5 and 7 will be described with reference to FIGS. 8 to 13.

Figure 8:
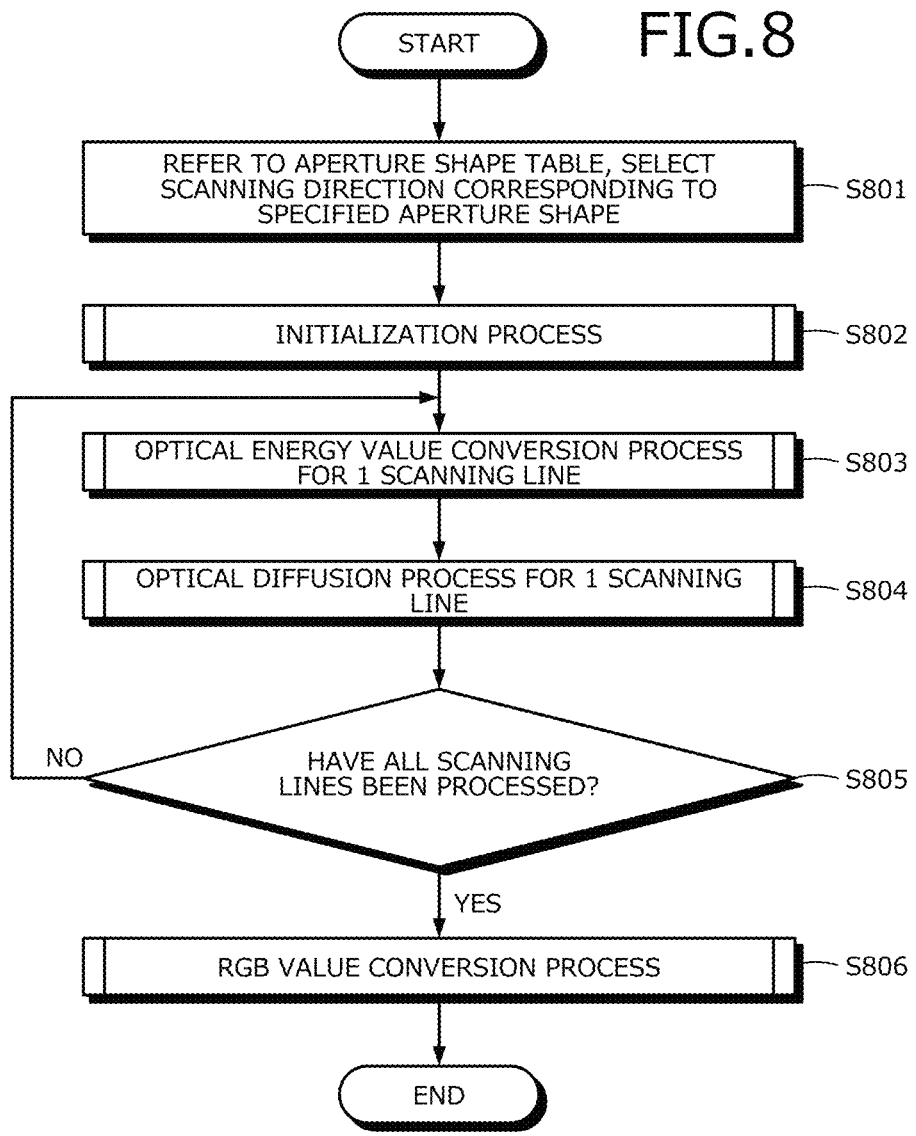
FIG. 8 is a flowchart of an example of an image conversion process procedure in a case of scanning in an x-axis direction.

FIG. 8 is a flowchart of an example of an image conversion process procedure in the case of scanning in the x-axis direction. The image conversion process is a process of converting an original image into a blurred image. First, the image conversion apparatus 100 refers to the aperture shape table 310 to select a scanning direction corresponding to the specified aperture shape (step S801). The image conversion apparatus 100 then executes an initialization process (step S802). The initialization process has a portion of process contents that change depending on the scanning direction. Details of the initialization process in the case of scanning in the x-axis direction will be described with reference to FIG. 9.

The image conversion apparatus 100 executes an optical energy value conversion process for one scanning line (step S803). The optical energy value conversion process has different process contents depending on the scanning direction. Details of the optical energy value conversion process in the case of scanning in the x-axis direction will be described with reference to FIG. 10.

The image conversion apparatus 100 executes an optical diffusion process for one scanning line (step S804). The optical diffusion process has different process contents depending on the scanning direction. Details of the optical diffusion process in the case of scanning in the x-axis direction will be described with reference to FIGS. 11 and 12.

The image conversion apparatus 100 determines whether all the scanning lines have been processed (step S805). A specific operation at step S805 differs depending on the scanning direction. The specific process contents will be described with reference to FIGS. 12, 21, and 26. If an unprocessed scanning line is present (step S805: NO), the image conversion apparatus 100 goes to the operation at step S803. If all the scanning lines have been processed (step S805: YES), the image conversion apparatus 100 executes an RGB value conversion process (step S806). The RGB value conversion process will be described with reference to FIG. 13.

After termination of the execution of step S806, the image conversion apparatus 100 terminates the image conversion process. By executing the image conversion process, the image conversion apparatus 100 can convert the original image into the blurred image.

Figure 9:
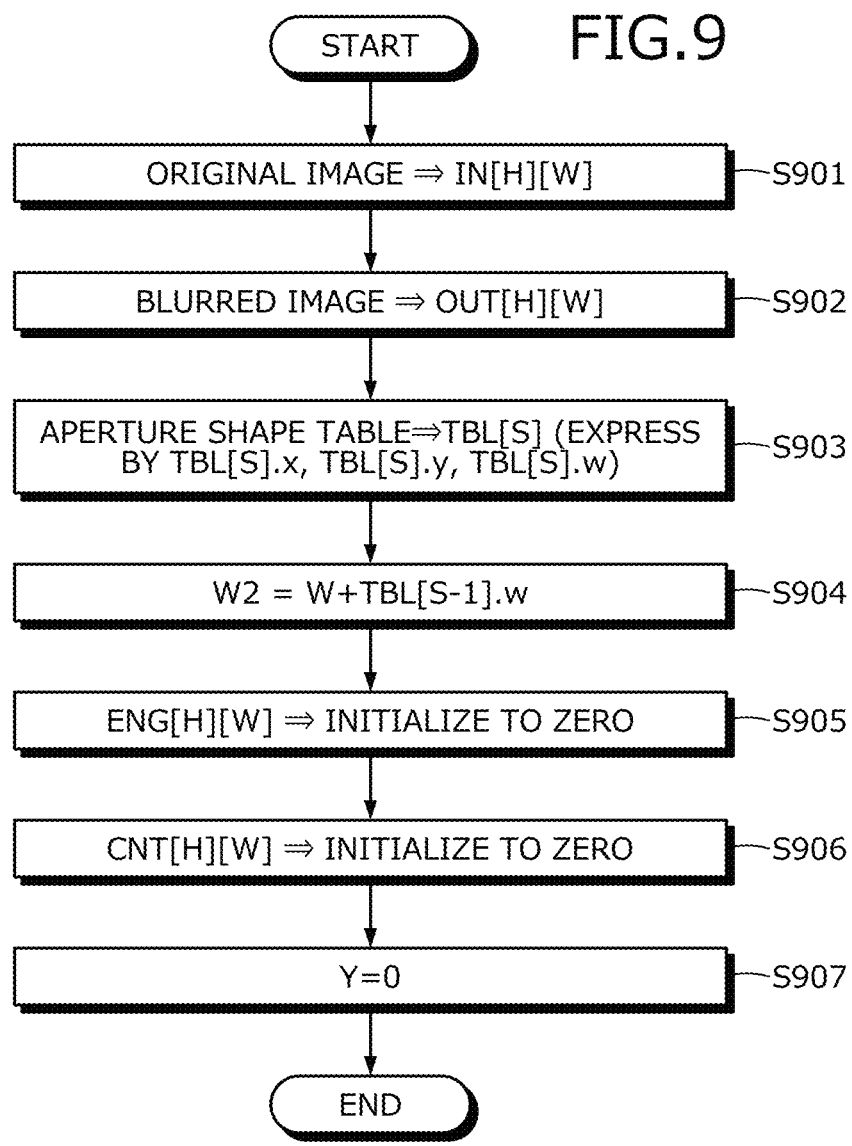
FIG. 9 is a flowchart of an example of an initialization process procedure in the case of scanning in the x-axis direction.

FIG. 9 is a flowchart of an example of an initialization process procedure in the case of scanning in the x-axis direction. The initialization process in the case of scanning in the x-axis direction is a process of initializing variables, arrays, and structures used in the image conversion process in the case of scanning in the x-axis direction.

The original image used in the flowchart of FIG. 9 may be a grayscale image or a structure having three numerical values of RGB. If the original image has three numerical values of RGB, the image conversion apparatus 100 may execute each of the processes for the original image IN and the blurred image OUT and the processes for an optical energy value ENG and temporary storage areas LINE1 and LINE2 (described later) three times according to RGB.

First, the image conversion apparatus 100 stores the pixels of the original image into a two-dimensional array IN[H][W] (step S901). The image conversion apparatus 100 establishes OUT[H][W] as a two-dimensional array storing the pixels of the blurred image (step S902). The image conversion apparatus 100 stores values of the records of the aperture shape table 310 into an array of a structure TBL[S] (step S903). S is a constant stored as the number of the records of the aperture shape table 310.

For example, a structure TBL has three elements of x, y, and w. The image conversion apparatus 100 stores a value of W+TBL[S−1]·w as a variable W2 (step S904). Since the aperture shape table 310 has records stored in ascending order of w, an arbitrary integer N (N<S) always satisfies TBL[N−1]·w≤TBL[N]·w. Therefore, TBL[S−1]·w is the maximum value of w.

The image conversion apparatus 100 initializes to zero, a two-dimensional array ENG[H][W] that stores an optical energy value (step S905). Similarly, the image conversion apparatus 100 initializes to zero, a two-dimensional array CNT[H][W] indicative of the number of times of addition of the optical energy value to each pixel (step S906). The image conversion apparatus 100 stores 0 as Y for a pixel row processed first (step S907). After termination of the execution of step S907, the image conversion apparatus 100 terminates the initialization process in the case of scanning in the x-axis direction. By executing the initialization process in the case of scanning in the x-axis direction, the image conversion apparatus 100 can initializes variables, arrays, and structures used in the image conversion process.

Figure 10:
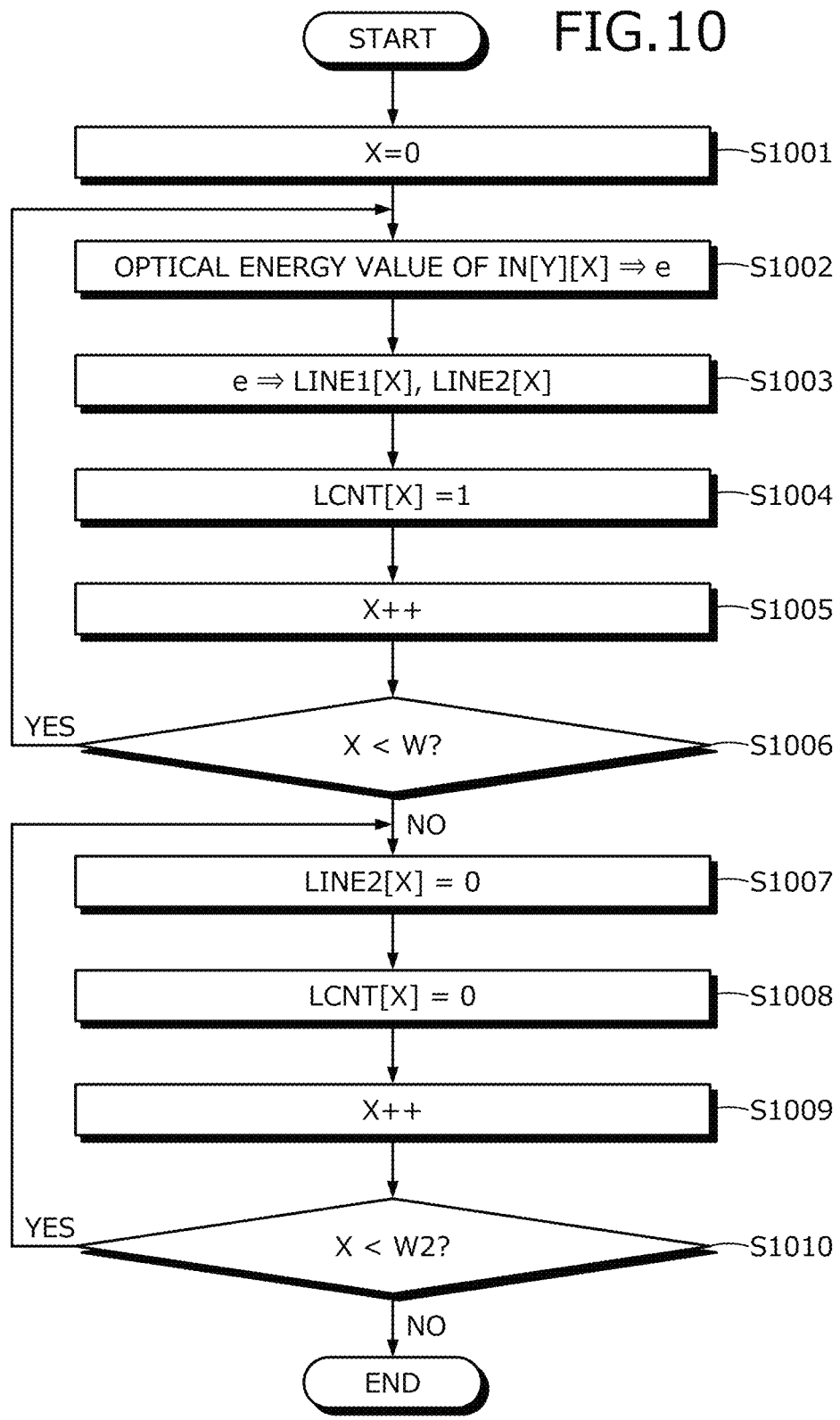
FIG. 10 is a flowchart of an example of an optical energy value conversion process procedure in the case of scanning in the x-axis direction.

FIG. 10 is a flowchart of an example of an optical energy value conversion process procedure in the case of scanning in the x-axis direction. The optical energy value conversion process in the case of scanning in the x-axis direction is a process of converting an RGB value into an optical energy value for the values of pixels of one line corresponding to one scanning line in the case of scanning in the x-axis direction.

First, the image conversion apparatus 100 initializes X to zero (step S1001). The image conversion apparatus 100 calculates the optical energy value of IN[Y][X] and stores the optical energy value as a variable e (step S1002). For example, the image conversion apparatus 100 uses Equation (1) as a specific optical energy value calculating formula to calculate the optical energy value from an RGB value.

$$\text{optical energy value} = \exp(IN[Y][X]/k - b) \quad (1)$$

In this equation, k and b are constants. For example, k=40 and b=−4.5 are used. It is noted that exp is a function returning a value acquired by raising the base of the natural logarithm to the power of the argument. Since the optical energy value is used many times, two arrays are established as LINE1 with a size of W and LINE2 with a size of W2. For example, the image conversion apparatus 100 stores a value of e into LINE1[X] and LINE2[X] acting as temporary storage areas (step S1003). As a result, a moving average of the width of one is stored in LINE1[X] and LINE2[X]. In a subsequent process, the moving averages of the widths of two, three, etc. are stored in LINE2, while the moving average of the width of one is kept stored in LINE1.

The image conversion apparatus 100 stores one into LCNT[X] that is an array LCNT with a size of W2 (step S1004). LCNT is a variable indicative of how many times each of the elements of LINE2 is added. The image conversion apparatus 100 increments a value of X (step S1005). The image conversion apparatus 100 determines whether X is less than W (step S1006). If X is less than W (step S1006: YES), the image conversion apparatus 100 goes to the operation at step S1002. If X is equal to or greater than W (step S1006: NO), since LINE2 and LCNT have a size of W2 greater than W, the image conversion apparatus 100 stores zero into LINE2[X] (step S1007). The image conversion apparatus 100 also stores zero into LCNT[X] (step S1008).

The image conversion apparatus 100 increments the value of X (step S1009). The image conversion apparatus 100 determines whether X is less than W2 (step S1010). If X is less than W2 (step S1010: YES), the image conversion apparatus 100 goes to the operation at step S1007. If X is equal to or greater than W2 (step S1010: NO), the image converting apparatus 100 terminates the optical energy value conversion process in the case of scanning in the x-axis direction. By executing the optical energy value conversion process in the case of scanning in the x-axis direction, the image converting apparatus 100 can acquire the optical energy value of pixels of one line corresponding to one scanning line.

Figure 11:
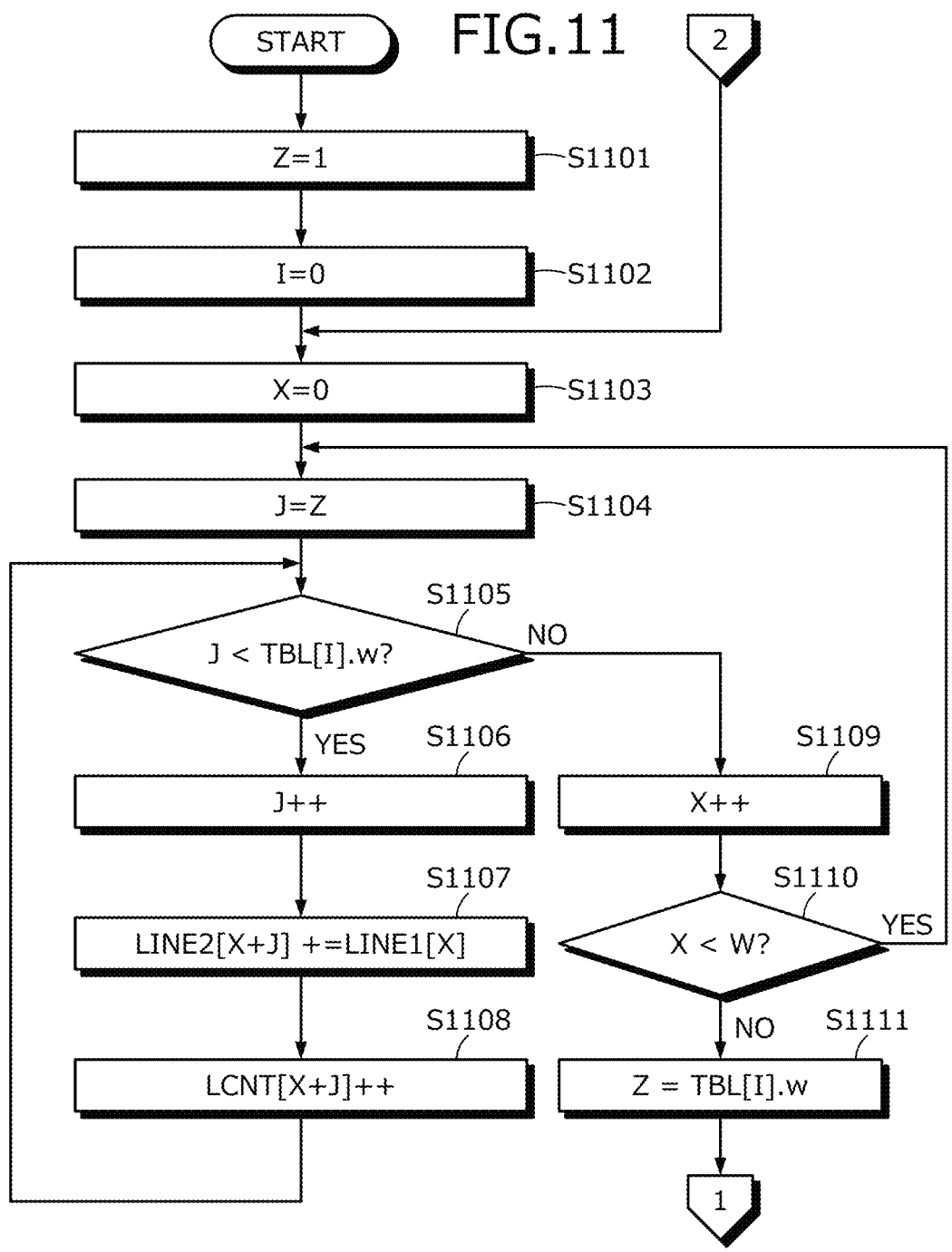
FIG. 11 is a flowchart (part 1) of an example of an optical diffusion process procedure in the case of scanning in the x-axis direction.

FIG. 11 is a flowchart (part 1) of an example of an optical diffusion process procedure in the case of scanning in the x-axis direction. The optical diffusion process in the case of scanning in the x-axis direction is a process of diffusing the optical energy value of each of the pixels of one line corresponding to one scanning line in the case of scanning in the x-axis direction. For example, in the flowchart of FIG. 11, the optical diffusion process is a process of diffusing the optical energy value of each of the pixels of one line in the x-axis direction by obtaining a moving average and, in the flowchart depicted in FIG. 11, the optical diffusion process is a process of diffusing the optical energy value of each of the pixels in the y-axis direction.

The image conversion apparatus 100 stores one as Z indicative of a width of the moving average (step S1101). The image conversion apparatus 100 stores zero as I indicative of an index of a currently processed record of the aperture shape table 310 (step S1102). By specifying I, the image conversion apparatus 100 extracts the first pixel row from the original image IN. After the execution at step S1102 or after step S1211: YES of FIG. 12 described later, the image conversion apparatus 100 stores zero as X (step S1103). The image conversion apparatus 100 stores the value of Z as J indicative of an offset value of a pixel to be added in LINE2 (step S1104).

To check whether the blur amount has increased, the image conversion apparatus 100 determines whether J is less than TBL[I]·w (step S1105). If J is less than TBL[I]·w (step S1105: YES), the image conversion apparatus 100 increments the value of J (step S1106). Since the value of J is updated, the image conversion apparatus 100 identifies IN[Y][X+J] specified by X+J as the diffusion source pixel affecting the first pixel and the second pixel. Therefore, the image conversion apparatus 100 stores the addition result of LINE2[X+J] and LINE1[X] into LINE2[X+J] (step S1107). The image conversion apparatus 100 then increments the value of LCNT[X+J] (step S1108). The image conversion apparatus 100 goes to the operation at step S1105.

If J is equal to or greater than TBL[I]·w (step S1105: NO), the image conversion apparatus 100 increments the value of X (step S1109). The image conversion apparatus 100 determines whether X is less than W (step S1110). If X is less than W (step S1110: YES), the image conversion apparatus 100 goes to the operation at step S1104. If X is equal to or greater than W (step S1110: NO), the image conversion apparatus 100 stores the value of TBL[I]·w as Z (step S1111). The image conversion apparatus 100 then goes to the operation at step S1201 depicted in FIG. 12.

Figure 12:
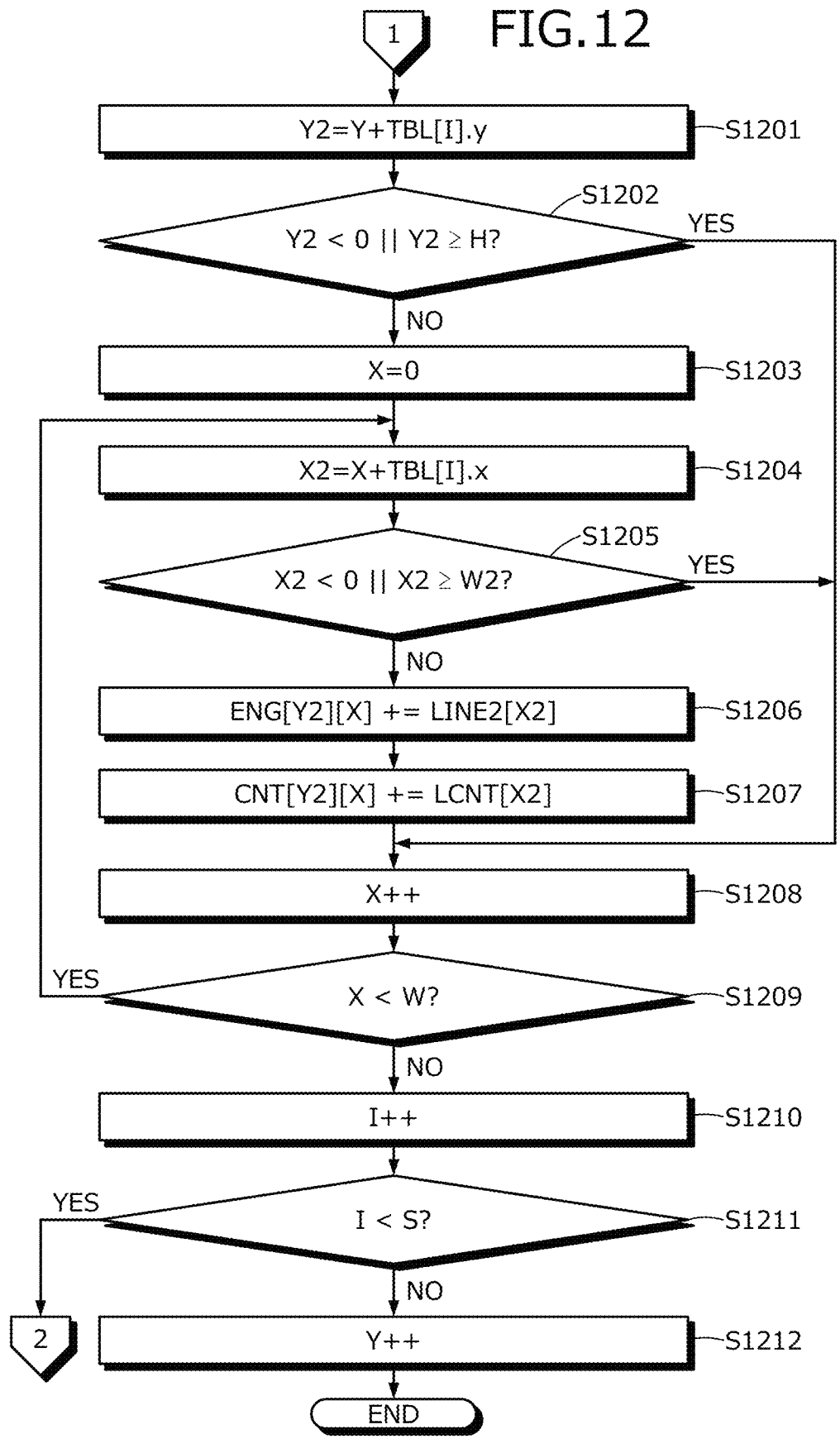
FIG. 12 is a flowchart (part 2) of the example of the optical diffusion process procedure in the case of scanning in the x-axis direction.

FIG. 12 is a flowchart (part 2) of the example of the optical diffusion process procedure in the case of scanning in the x-axis direction. Since TBL[I]·y indicates the amount of offset in the vertical direction when LINE2 is added, the image conversion apparatus 100 stores the addition result of Y and TBL[I]·y as Y2 indicative of a line to be added (step S1201). The image conversion apparatus 100 determines whether Y2 is less than zero or Y2 is equal to or greater than H (step S1202). The operation at step S1202 is a process of checking whether Y2 is within a screen. It is noted that "||" used at step S1202 of FIG. 12 is an operator for calculating a logical sum.

If Y2 is equal to or greater than zero and Y2 is less than H (step S1202: NO), the image conversion apparatus 100 stores zero as X (step S1203). The image conversion apparatus 100 stores the addition result of X and TBL[I]·x as X2 indicative of the position of the x-coordinate of the pixel to be referred to (step S1204). Since the position of the leftmost pixel in the line x defined as a blue start position is stored in TBL[I]·x, the image conversion apparatus 100 acquires the number of pixels from the leftmost pixel. The image conversion apparatus 100 determines whether X2 is less than zero or X2 is equal to or greater than W2 (step S1205). The operation at step S1205 is a process of checking whether X2 is within the screen.

If X2 is equal to or greater than zero and X2 is less than W2 (step S1205: NO), the image conversion apparatus 100 stores the addition result of ENG[Y2][X] and LINE2[X2] into ENG[Y2][X] (step S1206). The image conversion apparatus 100 stores the addition result of CNT[Y2][X] and LCNT[X2] into CNT[Y2][X] (step S1207).

After the operation at step S1207, or if Y2 is less than zero or Y2 is equal to or greater than H (step S1202: YES), or if X2 is less than zero or X2 is equal to or greater than W2 (step S1205: YES), the image conversion apparatus 100 increments the value of X (step S1208). The image conversion apparatus 100 determines whether X is less than W (step S1209). If X is less than W (step S1209: YES), the image conversion apparatus 100 goes to the operation at step S1204.

If X is equal to or greater than W (step S1209: NO), the image conversion apparatus 100 increments the value of I (step S1210). By incrementing the value of I, the image conversion apparatus 100 extracts from the original image IN, the second pixel row having the number of pixels successively overlapping the aperture shape equal to or greater than that of the first pixel row. The image conversion apparatus 100 determines whether I is less than S (step S1211). If I is less than S (step S1211: YES), the image conversion apparatus 100 goes to step S1103 of FIG. 11. If I is equal to or greater than S (step S1211: NO), the image conversion apparatus 100 increments the value of Y (step S1212). After the operation at step S1212, the image conversion apparatus 100 terminates the optical diffusion process in the case of scanning in the x-axis direction.

After termination of the optical diffusion process in the case of scanning in the x-axis direction, the image conversion apparatus 100 determines whether Y is less than H as the operation at step S805, thereby determining "whether all the scanning lines have been processed". If Y is less than H, an unprocessed scanning line still present and the image conversion apparatus 100 executes the operation at step S805: NO. If Y is equal to or greater than H, all the scanning lines have been processed and the image conversion apparatus 100 executes the operation for step S805: YES.

By executing the optical diffusion process in the case of scanning in the x-axis direction, the image conversion apparatus 100 can diffuse the optical energy value of each of the pixels of one line corresponding to one scanning line in the x- and y-directions.

FIG. 13 is a flowchart of an example of an RGB value conversion process procedure. The RGB value conversion process is a process of converting an optical energy value into an RGB value. It is noted that when reaching the RGB value conversion process, the image conversion apparatus 100 has completed the optical energy value ENG and the information CNT indicative of how many times each element of ENG is added.

First, the image conversion apparatus 100 stores zero as Y (step S1301). The image conversion apparatus 100 stores zero as X (step S1302). The image conversion apparatus 100 stores a quotient obtained by dividing ENG[Y][X] by CNT[Y][X] as e (step S1303). By the operation at step S1303, an average of added optical energy values can be obtained. The image conversion apparatus 100 stores the RGB value of e into OUT[Y][X] (step S1304). For example, the image conversion apparatus 100 uses Equation (2) as a specific RGB value calculating formula to calculate the RGB value from the optical energy value.

$$\text{RGB value} = k(b + \log(e))) \qquad (2)$$

In this equation, k and b are the same constants as those of Equation (1). It is noted that log is a function returning the natural logarithm of the argument. The image conversion apparatus 100 increments a value of X (step S1305). The image conversion apparatus 100 determines whether X is less than W (step S1306). If X is less than W (step S1306: YES), the image conversion apparatus 100 goes to the operation at step S1303. If X is equal to or greater than W (step S1306: NO), the image conversion apparatus 100 increments a value of Y (step S1307). The image conversion apparatus 100 determines whether Y is less than H (step S1308). If Y is less than H (step S1308: YES), the image conversion apparatus 100 goes to the operation at step S1302. If Y is equal to or greater than H (step S1308: NO), the image conversion apparatus 100 terminates the RGB value conversion process. By executing the RGB value conversion process, the image conversion apparatus 100 can acquire the blurred image.

An example of executing the image conversion process by using the aperture shape table 310 has been described with reference to FIGS. 4 to 13. The image conversion apparatus 100 can execute the image conversion process without using the aperture shape table 310. The image conversion process without using the aperture shape table 310 will hereinafter be described with reference to FIGS. 14 to 16.

Figure 14A:
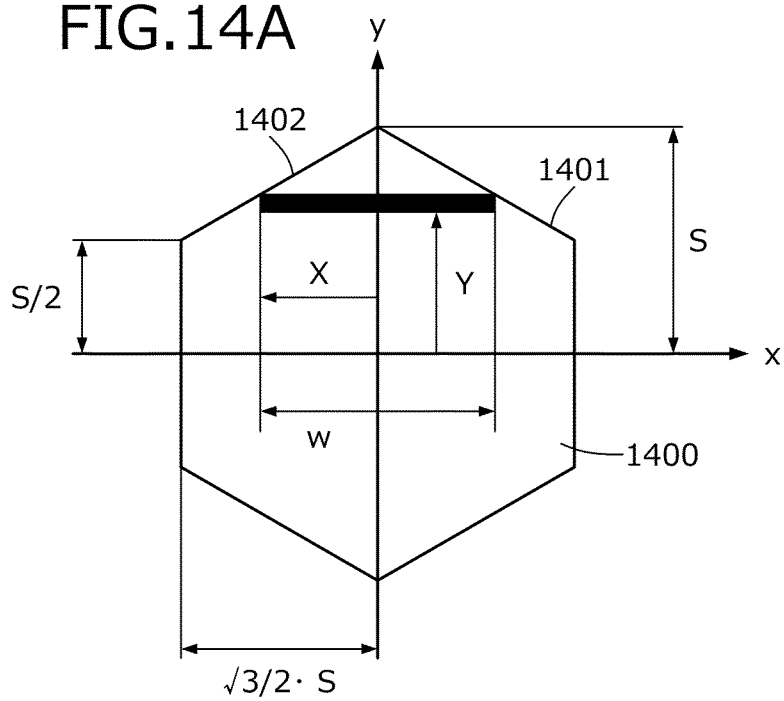
FIGS. 14A and 14B are explanatory diagrams of an operation example of the image conversion process without using the aperture shape table.
Figure 14B:
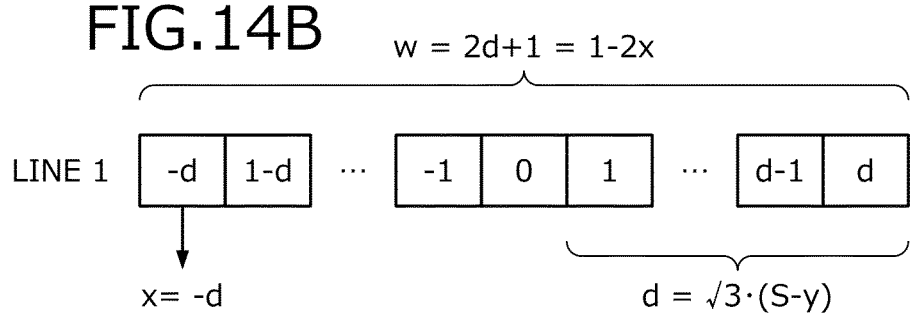

FIGS. 14A and 14B are explanatory diagrams of an operation example of the image conversion process without using the aperture shape table. FIG. 14A depicts an example of the case that an aperture shape 1400 is hexagonal. A blur amount w is obtained from a relationship between X and Y. One side of the aperture shape 1400 is denoted by S. Therefore, the maximum value of w is $(\sqrt{3}) \cdot S$. In this case $(\sqrt{x})$ is the positive square root of x. The relational expression of x and y for an oblique side 1401 is $y = -(\sqrt{3})/3x + S$ and the relational expression of x and y for an oblique side 1402 is $y = (\sqrt{3})/3x + S$. If Y is equal to or greater than S/2, x is $-(\sqrt{3})(S-y)$. If y is larger than zero and less than S/2, x is $(\sqrt{3})/2 \cdot S$.

FIG. 14B depicts contents of the temporary storage area LINE 1 storing the blur amount. In the case of $d = (\sqrt{3}) \cdot (S-y)$, w has a magnitude of $2d+1 = 1-2x$. LINE1[0] stores a value of the pixel indicated by $x = -d$.

A flowchart of the image conversion process without using the aperture shape table 310 will be described. The image conversion process without using the aperture shape table 310 involves the same operations as those depicted in the flowcharts in FIGS. 8 to 10 and 12 and therefore, these operations will not be described. Therefore, a flowchart of an optical diffusion process without using the aperture shape table 310 will be described with reference to FIGS. 15 and 16.

FIG. 15 is a flowchart (part 1) of an example of an optical diffusion process procedure without using the aperture shape table. Operations at steps S1510 to S1513 depicted in FIG. 15 are the same operations as those at steps S1106 to S1109 depicted in FIG. 11 and therefore, will not be described.

First, the image conversion apparatus 100 stores one as Z indicative of a width of the moving average (step S1501). The image conversion apparatus 100 stores a calculation result of 2S as a variable I indicative of a line to be processed in the aperture shape (step S1502). It is assumed that if I is an even number, the process line is higher than a line S/2 whereas if I is an odd number, the process line is equal to or lower than a line (S+1)/2.

If the operation at step S1502 is terminated or if the operation at step S1611 described later is terminated in FIG. 16, the image conversion apparatus 100 determines whether I is an odd number (step S1503). If I is an even number (step S1503: NO), the image conversion apparatus 100 stores a calculation result of ½ as a variable y indicative of a relative position between a current line and an affecting line (step S1504). The image conversion apparatus 100 determines if y is equal to or less than S/2 (step S1505). If y is equal to or less than S/2 (step S1505: YES), the image conversion apparatus 100 stores a calculation result of $-(\sqrt{3})(S-y)$ as x indicative of the blur start position (step S1506). The image conversion apparatus 100 stores a calculation result of $1-2x$ as w, which is the blur amount (step S1507).

The image conversion apparatus 100 stores a value of Z as J (step S1508). The image conversion apparatus 100 determines whether J is less than w (step S1509). If J is less than w (step S1509: YES), the image conversion apparatus 100 goes to the operation at step S1510. If J is equal to or greater than w (step S1509: NO), the image conversion apparatus 100 goes to the operation at step S1513.

After termination of the operation at step S1513, the image conversion apparatus 100 determines whether X is less than W (step S1514). If X is less than W (step S1514: YES), the image conversion apparatus 100 goes to the operation at step S1508. If X is equal to or greater than W (step S1514: NO), the image conversion apparatus 100 stores a value of w as Z (step S1515). If I is an odd number (step S1503: YES), the image conversion apparatus 100 stores a value of $-y$ as y (step S1516).

After termination of step S1515 or S1516 or if y is not equal to or less than S/2 (step S1505: NO), the image conversion apparatus 100 goes to the operation at step S1601 depicted in FIG. 16.

Figure 16:
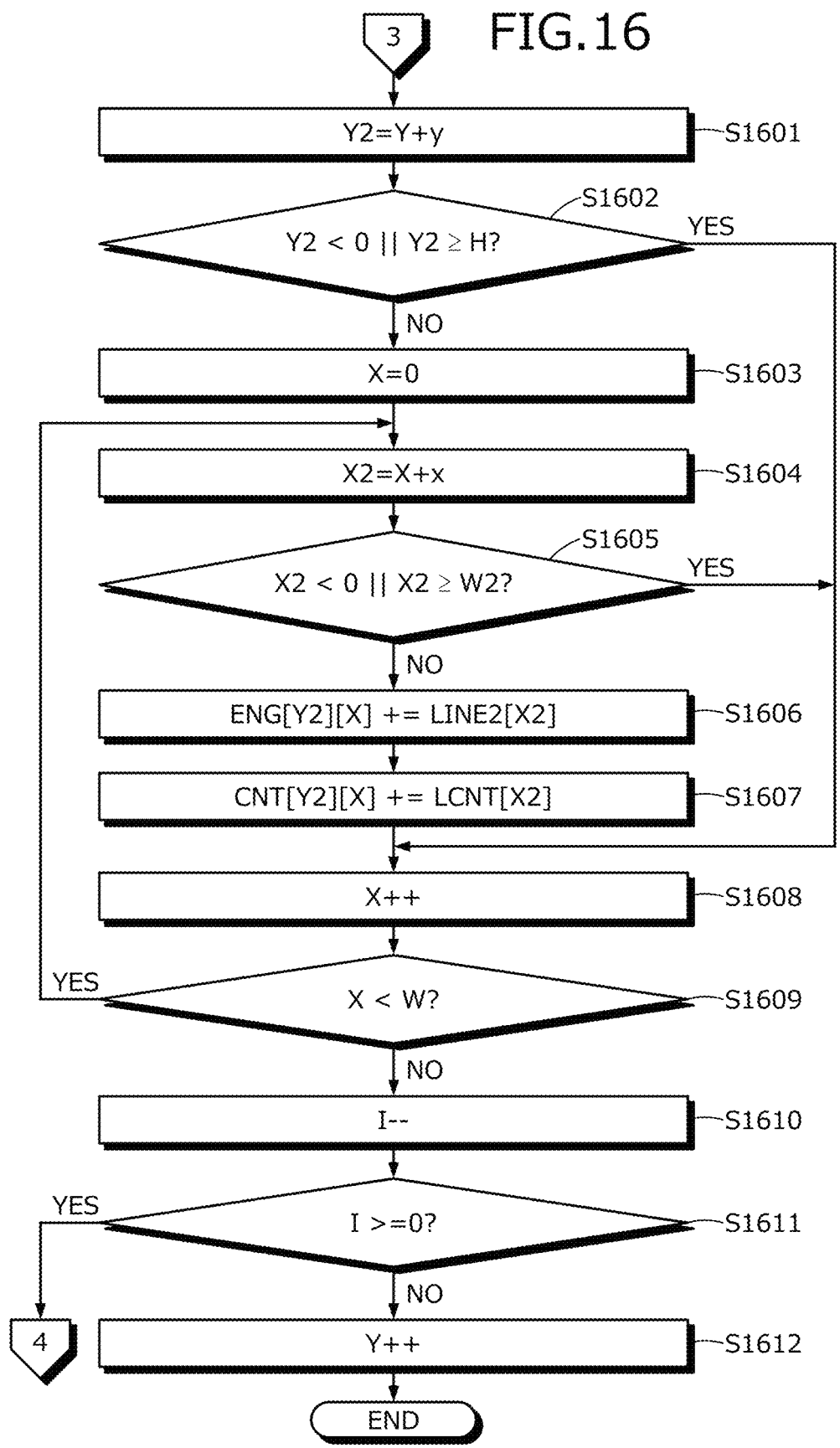
FIG. 16 is a flowchart (part 2) of the example of the optical diffusion process procedure without using the aperture shape table.

FIG. 16 is a flowchart (part 2) of the example of the optical diffusion process procedure without using the aperture shape table. Among the steps depicted in FIG. 16, steps S1601, S1604, S1610, and S1611 replace the operations at the steps described with reference to FIG. 12 having the same last two digits of the step number. The other steps are the same operations as those described with reference to FIG. 12 and therefore will not be described.

First, the image conversion apparatus 100 stores an addition result of Y and y as Y2 (step S1601). After termination of the operation at step S1603, the image conversion apparatus 100 stores an addition result of X and x as X2 (step S1604). In the case of step S1609: NO, the image conversion apparatus 100 decrements the value of I (step S1610). The image conversion apparatus 100 determines if I is equal to or greater than zero (step S1611). If I is equal to or greater than zero (step S1611: YES), the image conversion apparatus 100 goes to the operation at step S1503 depicted in FIG. 15. If I is less than zero (step S1611: NO), the image conversion apparatus 100 goes to the operation at step S1612.

The image conversion process in the case of scanning in the x-axis direction has been described with reference to FIGS. 4 to 16. The image conversion apparatus 100 may execute the image conversion process by scanning in the y-axis direction. The image conversion process in the case of scanning in the y-axis direction will be described with reference to FIGS. 17 to 21.

Figure 17:
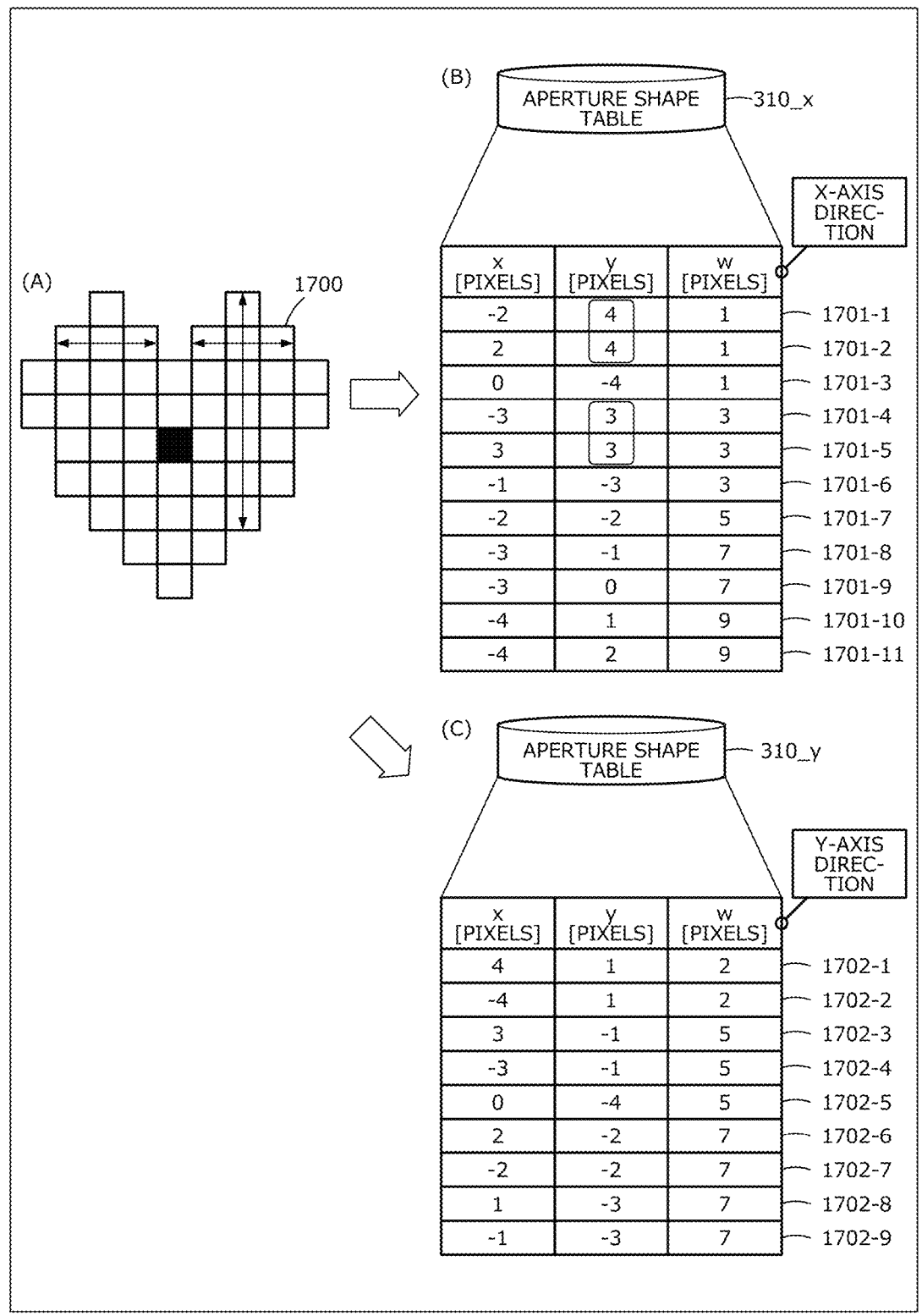
FIG. 17 is an explanatory diagram of a second example of an aperture shape and a second example of storage contents of the aperture shape table.

FIG. 17 is an explanatory diagram of a second example of an aperture shape and a second example of storage contents of the aperture shape table. (A) of FIG. 17 depicts an aperture shape 1700 on the x-y plane. As depicted in FIG. 17, the aperture shape 1700 has a heart shape. In the case of scanning in the x-axis direction, the aperture shape 1700 is divided into multiple regions. (B) of FIG. 17 depicts an example of storage contents of an aperture shape table 310_x when the aperture shape 1700 is scanned in the x-axis direction. The aperture shape table 310_x stores records 1701-1 to 1701-11. The aperture shape table 310_x stores the x-axis direction as the scanning direction in a correlated manner. In the case of scanning in the x-axis direction, each scanning line at y=3 and at y=4 is divided into multiple parts. If a scanning line is divided into multiple parts in this way, the process can be executed according to the flowcharts depicted in FIGS. 8 to 13.

(C) of FIG. 17 depicts an example of storage contents of an aperture shape table 310_y when the aperture shape 1700 is scanned in the y-axis direction. The aperture shape table 310_y stores records 1702-1 to 1702-9. The aperture shape table 310_y stores the y-axis direction as the scanning direction in a correlated manner. In the case of scanning in the y-axis direction, no scanning line is divided into multiple parts. Therefore, the number of records of the aperture shape table 310_y is less than that of the aperture shape table 310_x. If the number of records is smaller, the number of loops becomes smaller and therefore, the processing amount can be reduced.

Flowcharts of the image conversion process in the case of scanning in the y-axis direction will be described. The image conversion process in the case of scanning in the y-axis direction involves the same operations as the flowchart of the RGB value conversion process depicted in FIG. 13 and therefore, these operations will not be described. The initialization process, the optical energy value conversion process, and the optical diffusion process in the case of scanning in the y-axis direction will hereinafter be described with reference to FIGS. 18 to 21.

Figure 18:
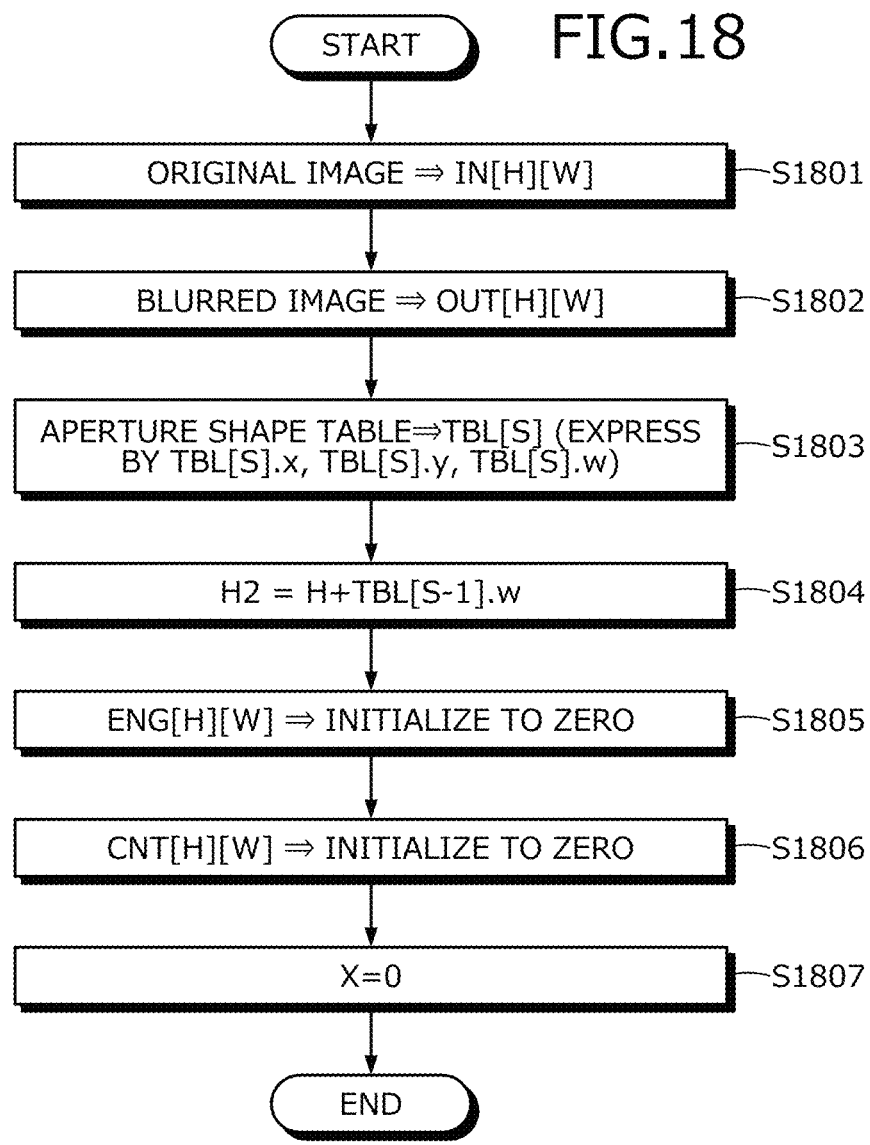
FIG. 18 is a flowchart of an example of the initialization process procedure in a case of scanning in a y-axis direction.

FIG. 18 is a flowchart of an example of the initialization process procedure in the case of scanning in the y-axis direction. The initialization process in the case of scanning in the y-axis direction is a process of initializing variables, arrays, and structures used in the image conversion process in the case of scanning in the y-axis direction. Steps S1804 and S1807 depicted in FIG. 18 replace the operations at the steps described with reference to FIG. 9 having the same last two digits of the step number. The other steps are the same operations as those described with reference to FIG. 9 and therefore will not be described.

After termination of the operation at step S1803, the image conversion apparatus 100 stores an addition result of H and TBL[S−1]·w as a variable H2 (step S1804). After termination of the operation at step S1806, The image conversion apparatus 100 stores 0 as X for a pixel row processed first (step S1807).

Figure 19:
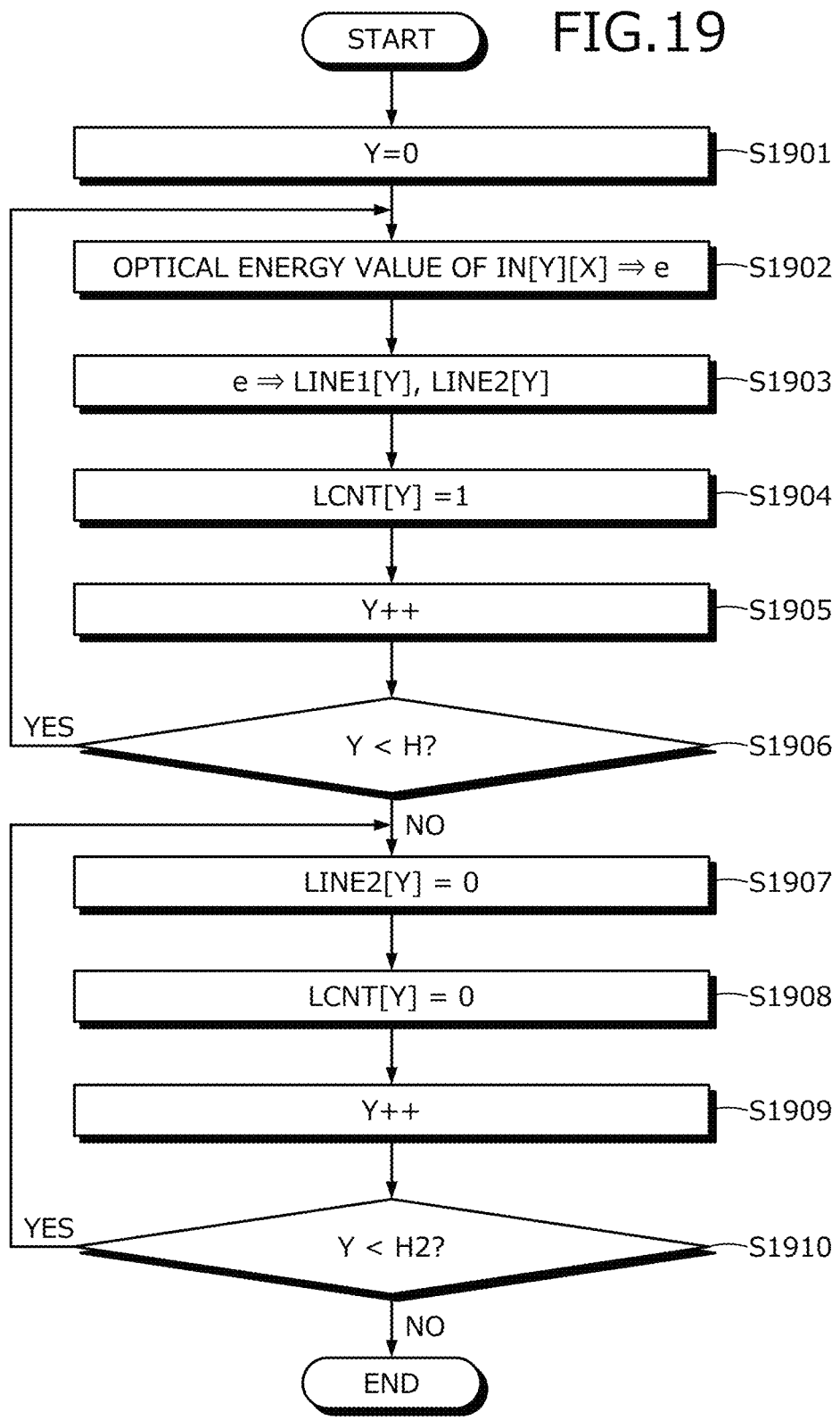
FIG. 19 is a flowchart of an example of the optical energy value conversion process procedure in the case of scanning in the y-axis direction.

FIG. 19 is a flowchart of an example of the optical energy value conversion process procedure in the case of scanning in the y-axis direction. The optical energy value conversion process in the case of scanning in the y-axis direction is a process of converting an RGB value into an optical energy value for values of pixels of one column corresponding to one scanning line in the case of scanning in the y-axis direction. Among the steps depicted in FIG. 19, steps S1901 and S1903 to S1910 are obtained by replacing "X" with "Y" in the operations at the steps described with reference to FIG. 10 having the same last two digits of the step number. Step S1906 is acquired by replacing "W" with "H" of step S1006. Step S1910 is obtained by replacing "W2" with "H2" of step S1006. The steps are not changed except the above points and therefore, will not be described.

Figure 20:
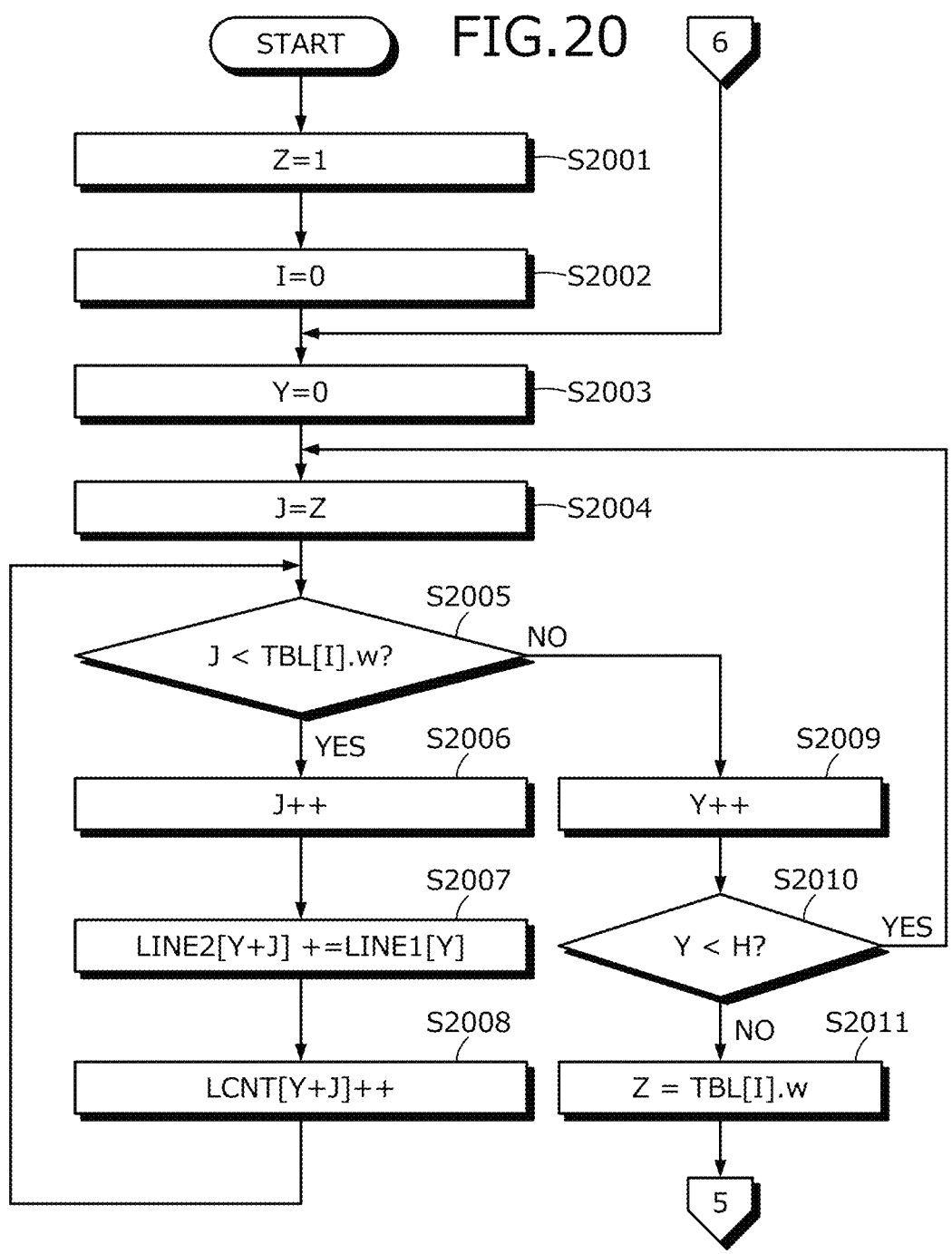
FIG. 20 is a flowchart (part 1) of an example of the optical diffusion process procedure in the case of scanning in the y-axis direction.

FIG. 20 is a flowchart (part 1) of an example of the optical diffusion process procedure in the case of scanning in the y-axis direction. The optical diffusion process in the case of scanning in the y-axis direction is a process of diffusing the optical energy value of each of the pixels of one column corresponding to one scanning line in the case of scanning in the y-axis direction. Among the steps depicted in FIG. 20, steps S2003 and S2007 to S2010 are obtained by replacing "X" with "Y" in the operations at the steps described with reference to FIG. 11 having the same last two digits of the step number. Step S2010 is obtained by replacing "W" with "H" of step S1110. The steps are not changed except the above points and therefore, will not be described.

Figure 21:
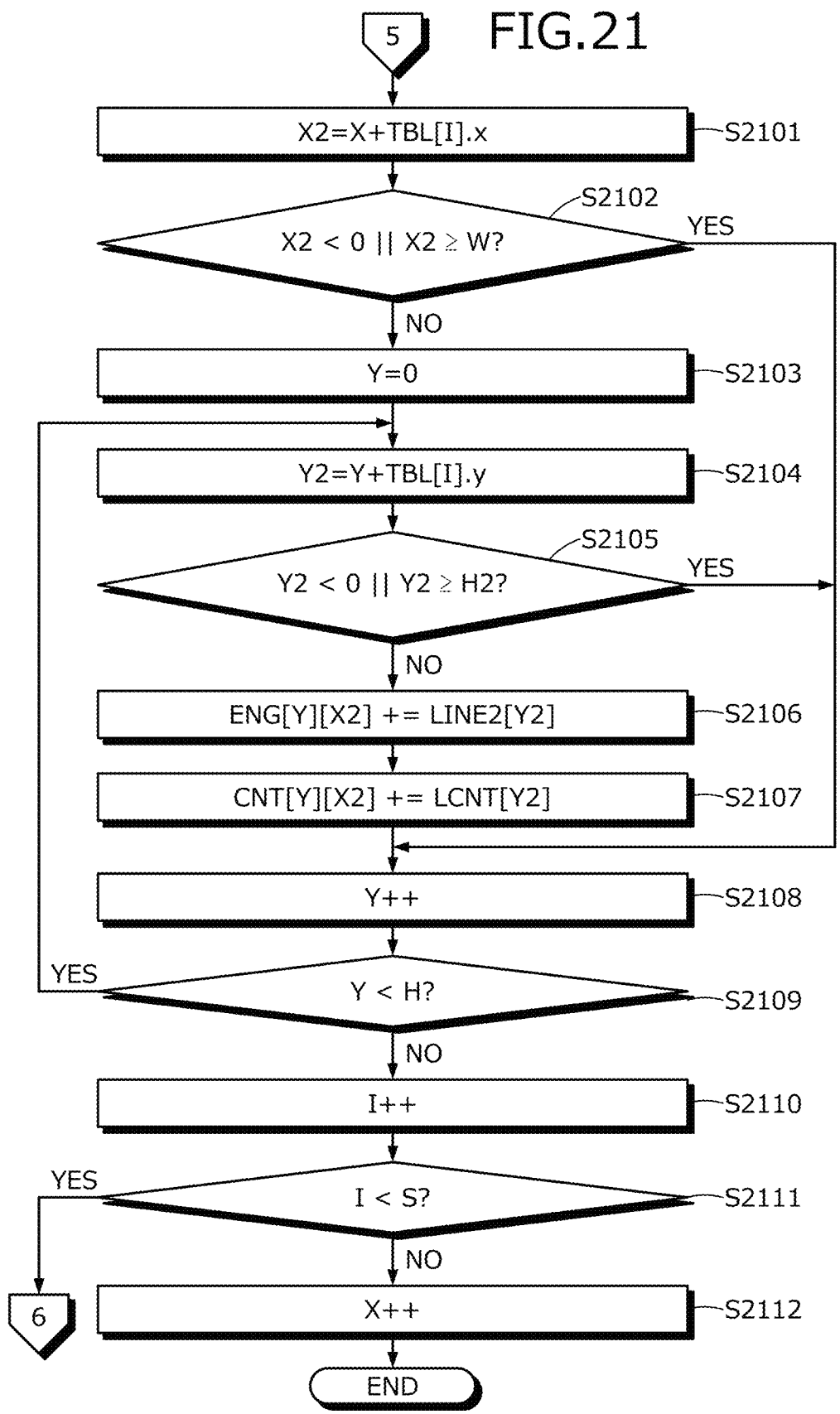
FIG. 21 is a flowchart (part 2) of the example of the optical diffusion process procedure in the case of scanning in the y-axis direction.

FIG. 21 is a flowchart (part 2) of the example of the optical diffusion process procedure in the case of scanning in the y-axis direction. Among the steps depicted in FIG. 21, steps S2103, S2108, S2109, and S2112 are obtained by replacing "X" with "Y" in the operations at the steps described with reference to FIG. 12 having the same last two digits of the step number. Step S2109 is obtained by replacing "W" with "H" of step S1209. Steps S2101, S2102, S2104, and S2105 are changed from the operations at the steps described with reference to FIG. 12 having the same last two digits of the step number and therefore, will be described. Steps S2106 and S2107 are the same processes as steps S1206 and S1207 and therefore, will not be described.

First, the image conversion apparatus 100 stores an addition result of X and TBL[I]·x as X2 (step S2101). The image conversion apparatus 100 determines whether X2 is less than zero or X2 is equal to or greater than W (step S2102). If X2 is equal to or greater than zero and X2 is less than W (step S1202: NO), the image conversion apparatus 100 goes to the operation at step S2103. If X2 is less than zero or X2 is equal to or greater than W (step S1202: YES), the image conversion apparatus 100 goes to the operation at step S2108.

After termination of the execution of step S2103, the image conversion apparatus 100 stores an addition result of Y and TBL[I]·y as Y2 (step S2104). The image conversion apparatus 100 determines whether Y2 is less than zero or Y2 is equal to or greater than H2 (step S2105). If Y2 is equal to or greater than zero and Y2 is less than H2 (step S1205: NO), the image conversion apparatus 100 goes to the operation at step S2106. If Y2 is less than zero or Y2 is equal to or greater than H2 (step S2105: YES), the image conversion apparatus 100 goes to the operation at step S2108.

After termination of the optical diffusion process in the case of scanning in the y-axis direction, the image conversion apparatus 100 determines whether X is less than W as the operation at step S805, thereby determining "whether all the scanning lines have been processed". If X is less than W, an unprocessed scanning line is still present and the image conversion apparatus 100 executes the operation at step S805: NO. If X is equal to or greater than W, all the scanning lines have been processed and the image conversion apparatus 100 executes the operation at step S805: YES.

The image generating process in the case of scanning in the y-axis direction has been described with reference to FIGS. 17 to 21. The image conversion apparatus 100 may execute the image conversion process by scanning obliquely to the x-axis and y-axis directions. The image conversion process in the case of scanning in a y=−X direction as an example of the diagonal direction will hereinafter be described with reference to FIGS. 22A to 29. The description of FIGS. 22A to 29 is on the basis of H>W for simplicity of description.

FIGS. 22A, 22B, 22C, 22D, and 22E are explanatory diagrams of an operation example of the image conversion process in the case of scanning in the y=−X direction. FIG. 22A depicts an aperture shape 2200 that should be scanned in the y=−X direction rather than the horizontal and vertical directions. Although not depicted in FIGS. 22A to 22E, the aperture shape table 310 storing the aperture shape 2200 stores the y=−X direction as the scanning direction in a correlated manner. FIG. 22B depicts positions indicated by variables in the case of scanning in the diagonal direction. P indicates the number of pixels included in a pixel row in the current scanning direction. Q indicates the number of pixels that are object pixels in a pixel row. R indicates an index of a pixel row.

FIG. 22C depicts values of R and Q of pixels when the original image IN has W=4 and H=6. For example, IN[4][1] has R=6 and Q=1. Pixels of the pixel row R=6 are four pixels IN[5] [0], IN[4] [1], IN[3] [2], and IN[2] [3] and therefore, P is four.

FIG. 22D depicts positions of R2 indicative of an index of a pixel row to be added and an offset Ro. FIG. 22E depicts a relationship of R, R2, and Ro when the original image IN has W=4 and H=6. In the case of R=3 and R2=4, Ro is −1.

Flowcharts of the image conversion process in the case of scanning in the y=−X direction will be described. The image conversion process in the case of scanning in the y=−X direction involves the same operations as the flowchart of the RGB value conversion process depicted in FIG. 13 and therefore, these operations will not be described. The initialization process, the optical energy value conversion process, and the optical diffusion process in the case of scanning in the y=−X direction will hereinafter be described with reference to FIGS. 23 to 26.

Figure 23:
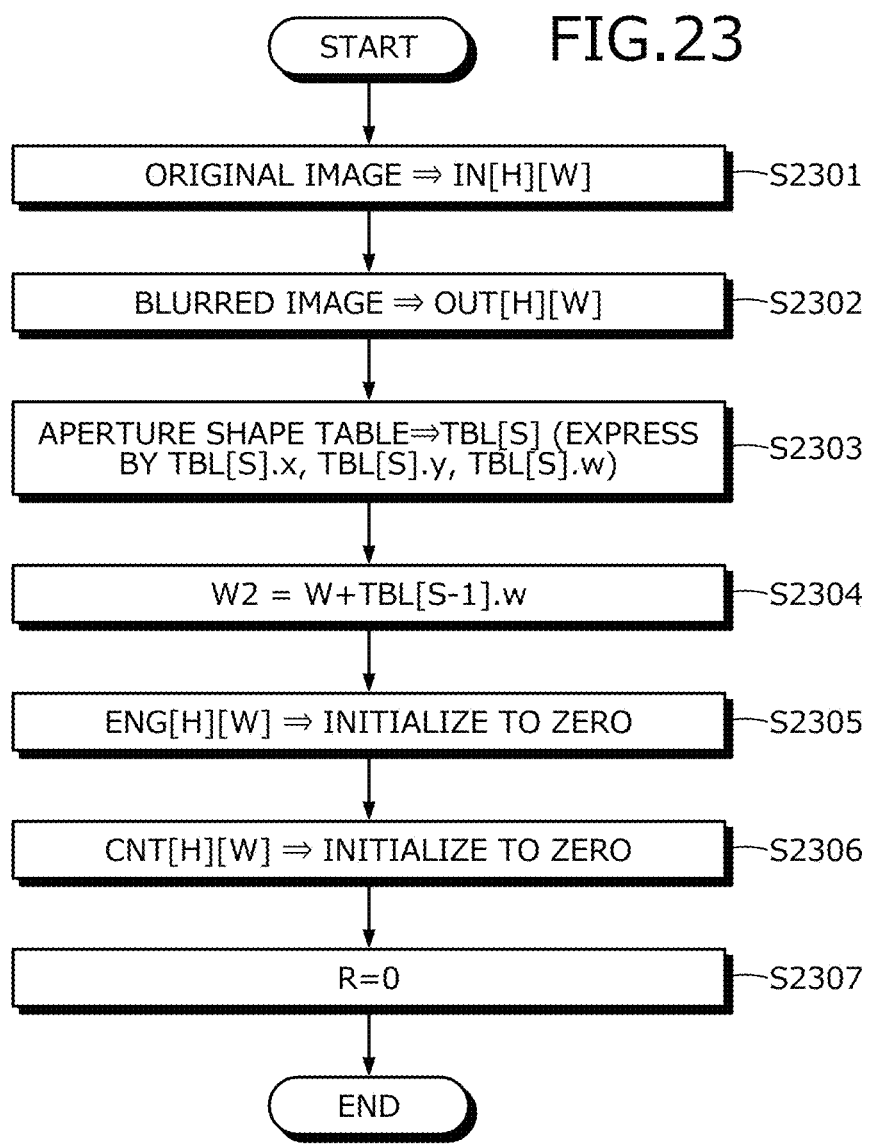
FIG. 23 is a flowchart of an example of the initialization process procedure in the case of scanning in the y=−X direction.

FIG. 23 is a flowchart of an example of the initialization process procedure in the case of scanning in the y=−X direction. The initialization process in the case of scanning in the y=−X direction is a process of initializing variables, arrays, and structures used in the image conversion process in the case of scanning in the y=−X direction. Step S2307 depicted in FIG. 23 replaces the operations at the steps described with reference to FIG. 9 having the same last two digits of the step number. The other steps are the same operations as those described with reference to FIG. 9 and therefore, will not be described. After termination of the operation at step S2306, the image conversion apparatus 100 stores zero as R (step S2307).

Figure 24:
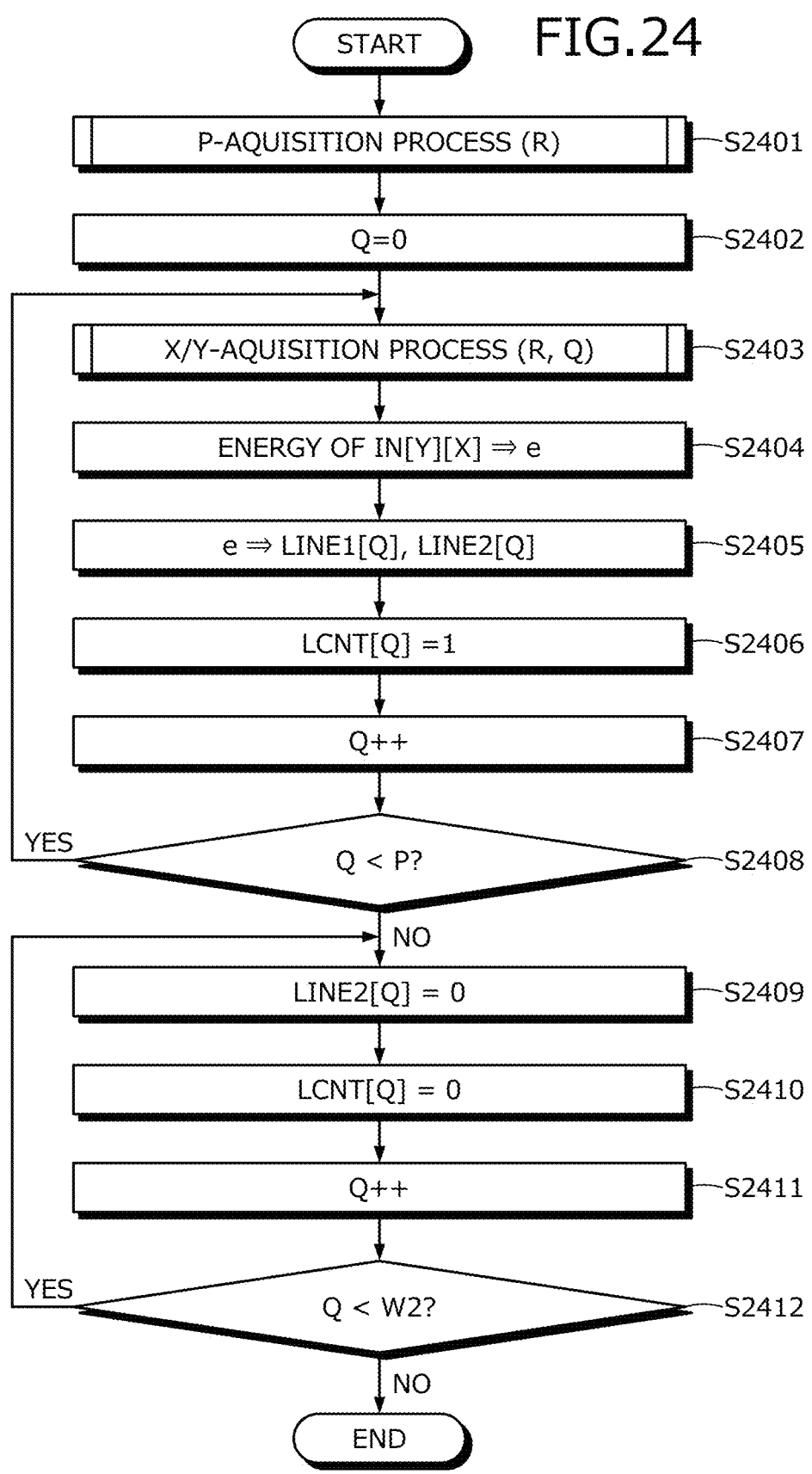
FIG. 24 is a flowchart of an example of the optical energy value conversion process procedure in the case of scanning in the y=−X direction.

FIG. 24 is a flowchart of an example of the optical energy value conversion process procedure in the case of scanning in the y=−X direction. The optical energy value conversion process in the case of scanning in the y=−X direction is a process of converting an RGB value into an optical energy value for values of pixels of a pixel group corresponding to one scanning line in the case of scanning in the y=−X direction. Among the steps depicted in FIG. 24, steps S2405 to S2412 are obtained by replacing "X" with "Q" in the operations at steps S1003 to S1010 of FIG. 10 having the last two digits of the step number smaller by two. Step S2408 is obtained by replacing "W" with "P" of step S1006.

First, the image conversion apparatus 100 executes a P-acquisition process by using R as the argument (step S2401). Details of the P-acquisition process will be described later with reference to FIG. 27. The image conversion apparatus 100 stores zero as Q (step S2402). The image conversion apparatus 100 executes an X/Y-acquisition process by using R and Q as the arguments (step S2403).

Figure 25:
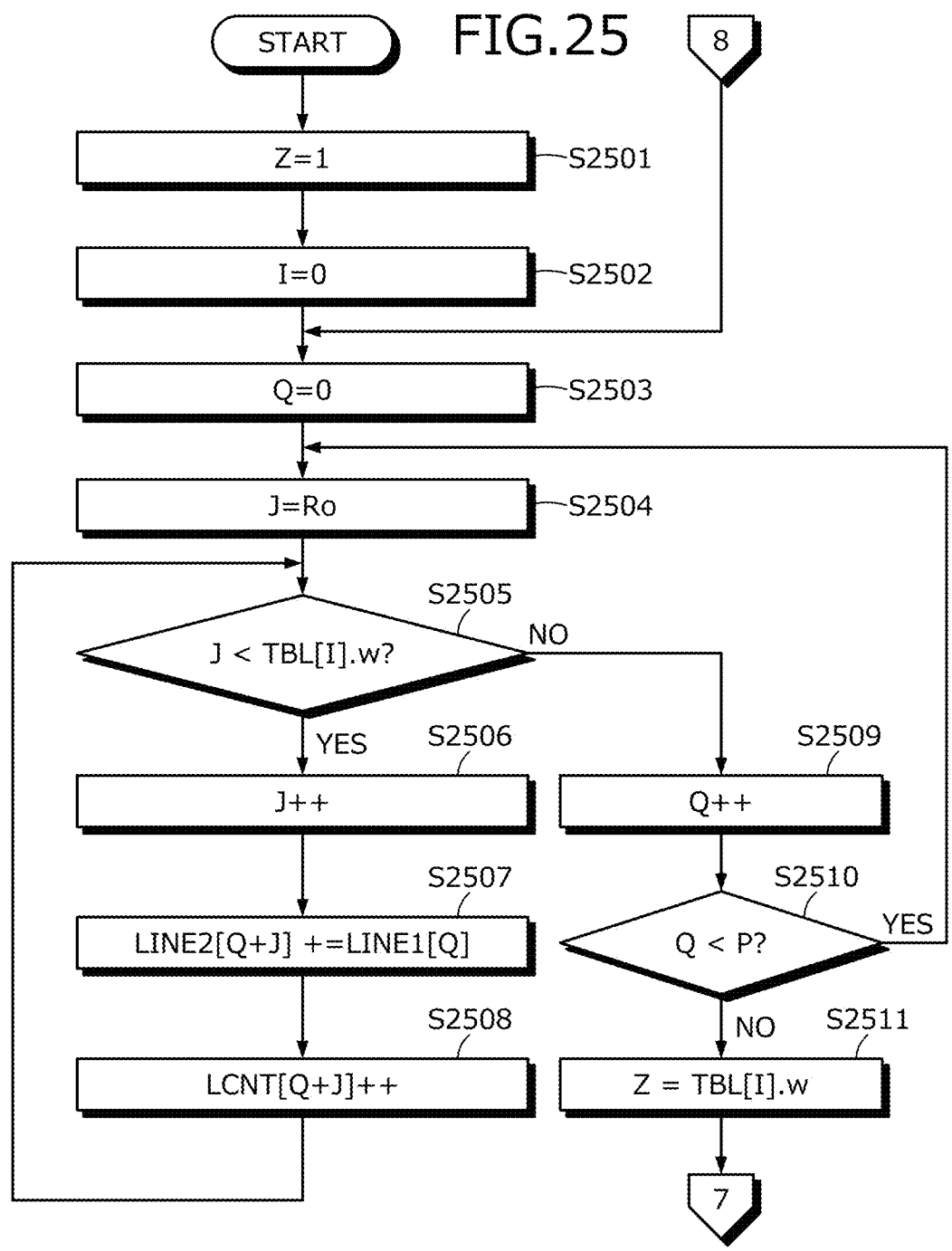
FIG. 25 is a flowchart (part 1) of an example of the optical diffusion process procedure in the case of scanning in the y=−X direction.

FIG. 25 is a flowchart (part 1) of an example of the optical diffusion process procedure in the case of scanning in the y=−X direction. The optical diffusion process in the case of scanning in the y=−X direction is a process of diffusing the optical energy value of pixels of a pixel group corresponding to one scanning line in the case of scanning in the y=−X direction. Among the steps depicted in FIG. 25, steps S2503 and S2507 to S2510 are obtained by replacing "X" with "Q" in the operations at the steps described with reference to FIG. 11 having the same last two digits of the step number. Step S2510 is obtained by replacing "W" with "P" of step S1110. The steps are not changed except the above points and therefore, will not be described.

Figure 26:
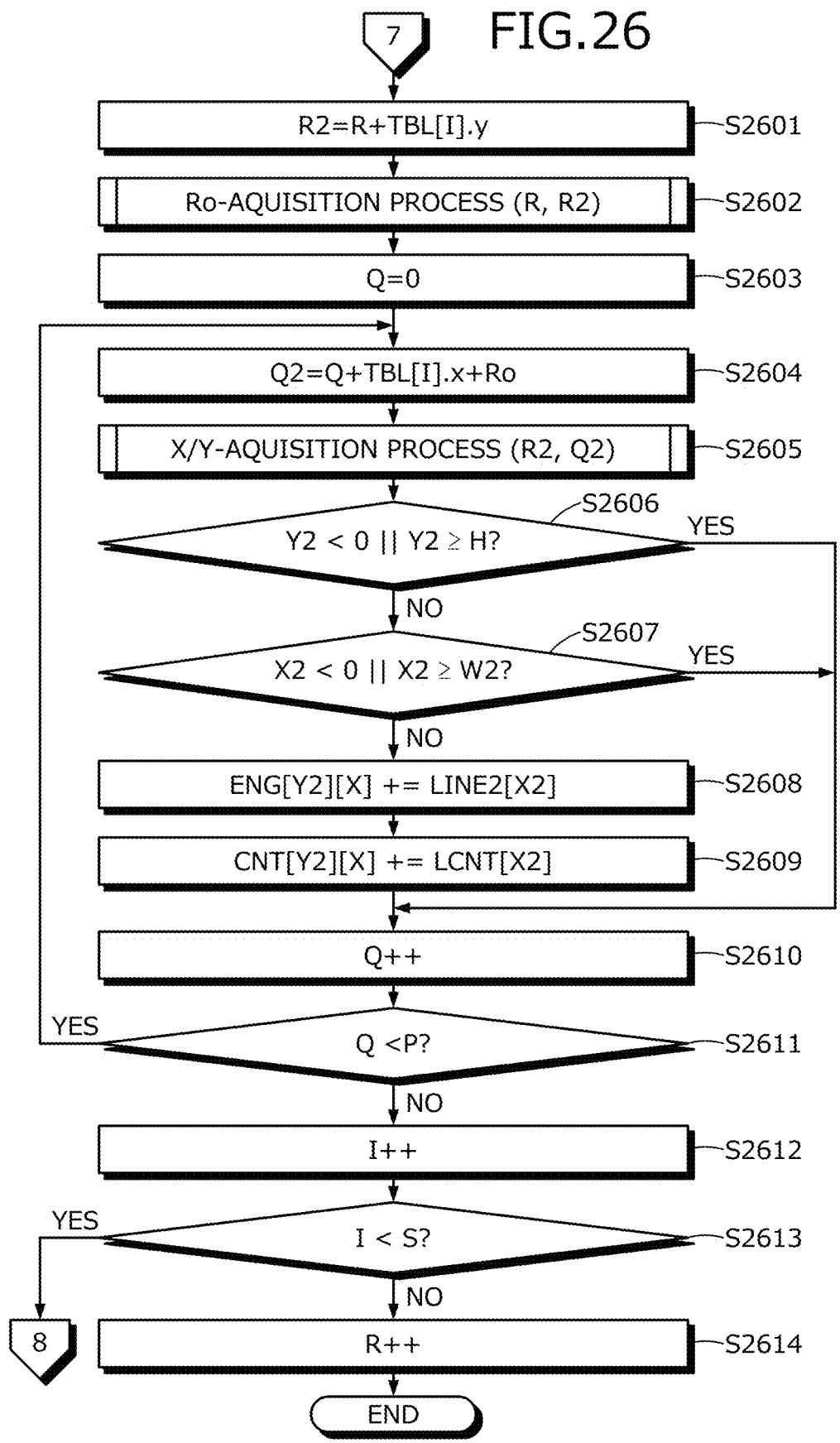
FIG. 26 is a flowchart (part 2) of the example of the optical diffusion process procedure in the case of scanning in the y=−X direction.

FIG. 26 is a flowchart (part 2) of the example of the optical diffusion process procedure in the case of scanning in the y=−X direction. Among the steps depicted in FIG. 26, steps S2610 and S2611 are obtained by replacing "X" with "Q" in the operations at steps S1208 and S1209 described with reference to FIG. 12. Step S2614 is obtained by replacing "Y" with "R" of step S1212. The operations at steps S2607 to S2609 and S2613 are the same as the operations at steps S1205 to S1207 and S1211 described with reference to FIG. 12 and therefore, will not be described. Steps S2601 to S2606 will hereinafter be described.

After termination of the execution of step S2511, the image conversion apparatus 100 stores an addition result of R and TBL[I]·y as R2 (step S2601). The image conversion apparatus 100 executes a Ro-acquisition process by using R and R2 as the arguments (step S2602). Details of the Ro-acquisition process will be described with reference to FIG. 29. The image conversion apparatus 100 stores zero as Q (step S2603). The image conversion apparatus 100 stores an addition result of Q and TBL[I]·x as Q2 (step S2604). The image conversion apparatus 100 executes the X/Y-acquisition process by using R2 and Q2 as the arguments (step S2605). By executing the X/Y-acquisition process by using R2 and Q2 as the arguments, the image conversion apparatus 100 can acquire X2 and Y2.

The image conversion apparatus 100 determines whether Y2 is less than zero or Y2 is equal to or greater than H (step S2606). If Y2 is equal to or greater than zero and Y2 is less than H (step S2606: NO), the image conversion apparatus 100 goes to the operation at step S2607. If Y2 is less than zero or Y2 is equal to or greater than H (step S2606: YES), the image conversion apparatus 100 goes to the operation at step S2610.

After termination of the optical diffusion process in the case of scanning in the y=−X direction, the image conversion apparatus 100 determines whether R is less than an addition result of H and W as the operation at step S805, thereby determining "whether all the scanning lines have been processed". If R is less than an addition result of H and W, an unprocessed scanning line is still present and the image conversion apparatus 100 executes the operation at step S805: NO. If R is equal to or greater than the sum of H and W, all the scanning lines have been processed and the image conversion apparatus 100 executes the operation at step S805: YES.

Figure 27:
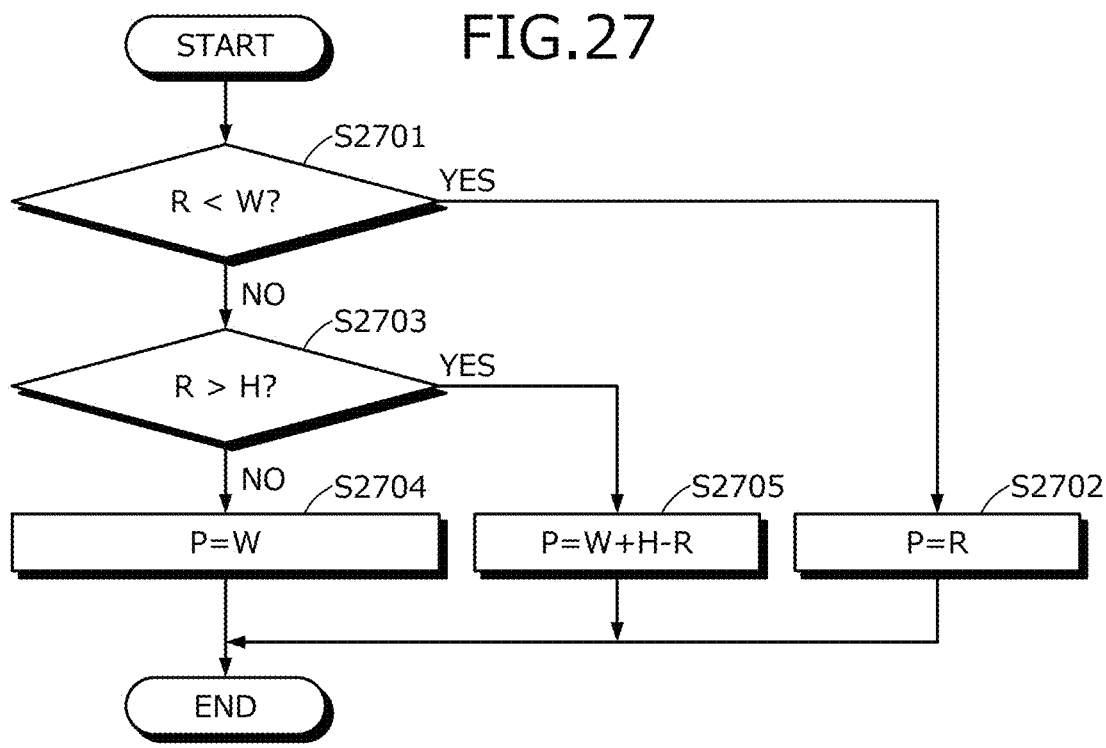
FIG. 27 is a flowchart of an example of a P-acquisition process procedure.

FIG. 27 is a flowchart of an example of a P-acquisition process procedure. The P-acquisition process is a process of outputting a value of P by using R as the argument. The image conversion apparatus 100 determines whether R is less than W (step S2701). If R is less than W (step S2701: YES), the image conversion apparatus 100 stores a value of R as P (step S2702). If R is equal to or greater than W (step S2701: NO), the image conversion apparatus 100 determines whether R is larger than H (step S2703). If R is equal to or greater than H (step S2703: NO), the image conversion apparatus 100 stores a value of W as P (step S2704). If R is larger than H (step S2703: YES), the image conversion apparatus 100 stores a result of subtraction of R from an addition result of W and H as P (step S2705).

After execution of the operation at step S2702, the operation at step S2704, or the operation at step S2705, the image conversion apparatus 100 terminates the P-acquisition process. By executing the P-acquisition process, the image conversion apparatus 100 can obtain the value of P.

Figure 28:
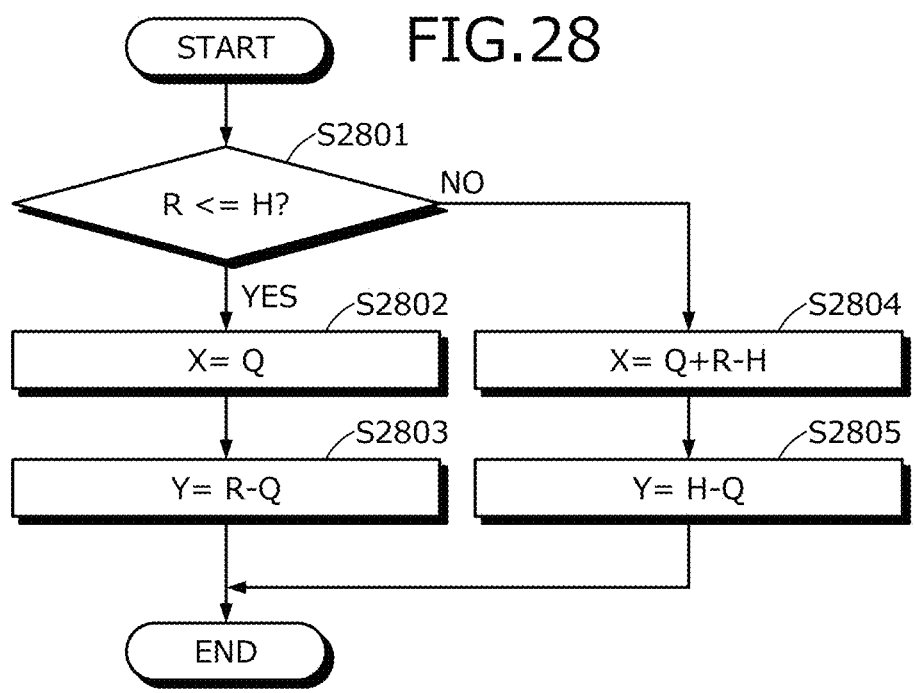
FIG. 28 is a flowchart of an example of an X/Y-acquisition process procedure.

FIG. 28 is a flowchart of an example of an X/Y-acquisition process procedure. The X/Y-acquisition process is a process of outputting values of X and Y by using R and Q as the arguments. The image conversion apparatus 100 determines whether R is equal to or less than H (step S2801). If R is equal to or less than H (step S2801: YES), the image conversion apparatus 100 stores a value of Q as X (step S2802). The image conversion apparatus 100 stores the difference of Q subtracted from R, as Y (step S2803).

If R is greater than H (step S2801: NO), the image conversion apparatus 100 stores the difference of subtracting H from the sum of Q+R, as X (step S2804). The image conversion apparatus 100 stores the difference of subtracting Q from H, as Y (step S2805). After execution of the operation at step S2803 or the operation at step S2805, the image conversion apparatus 100 terminates the X/Y-acquisition process. By executing the X/Y-acquisition process, the image conversion apparatus 100 can obtain the values of X and Y.

Figure 29:
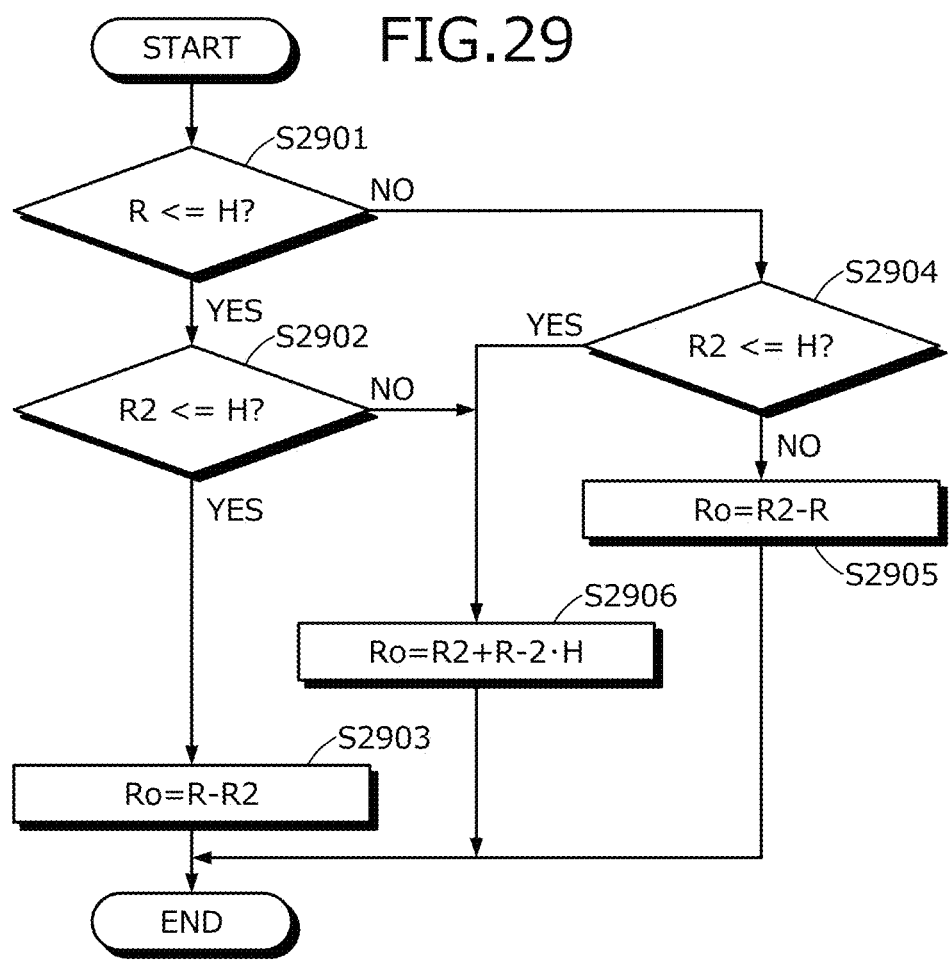
FIG. 29 is a flowchart of an example of a Ro-acquisition process procedure.

FIG. 29 is a flowchart of an example of a Ro-acquisition process procedure. The Ro-acquisition process is a process of outputting a value of Ro by using R and R2 as the arguments. The image conversion apparatus 100 determines if R is equal to or less than H (step S2901). If R is equal to or less than H (step S2901: YES), the image conversion apparatus 100 determines whether R2 is equal to or less than H (step S2902). If R2 is equal to or less than H (step S2902: YES), the image conversion apparatus 100 stores the difference of subtracting R2 from R, as Ro (step S2903).

If R is not equal to or less than H (step S2901: NO), the image conversion apparatus 100 determines if R2 is equal to or less than H (step S2904). If R2 is greater than H (step S2904: NO), the image conversion apparatus 100 stores the difference of subtracting R2 from R, as Ro (step S2905).

If R2 is not equal to or less than H (step S2902: NO) or if R2 is equal to or less than H (step S2904: YES), the image conversion apparatus 100 stores the difference of subtracting 2·H from the sum of R2 and R, as Ro (step S2906). After execution of the operation at step S2903, step S2905, or step S2906, the image conversion apparatus 100 terminates the Ro-acquisition process. By executing the Ro-acquisition process, the image conversion apparatus 100 can acquire the value of Ro.

Although the same pixel row is not scanned multiple times in FIGS. 4 to 29, the same pixel row may be scanned multiple times. By scanning the same pixel row multiple times, diffusion other than the moving average can be achieved. An example of scanning the same pixel row multiple times will be described with reference to FIGS. 30 and 31.

Figure 30:
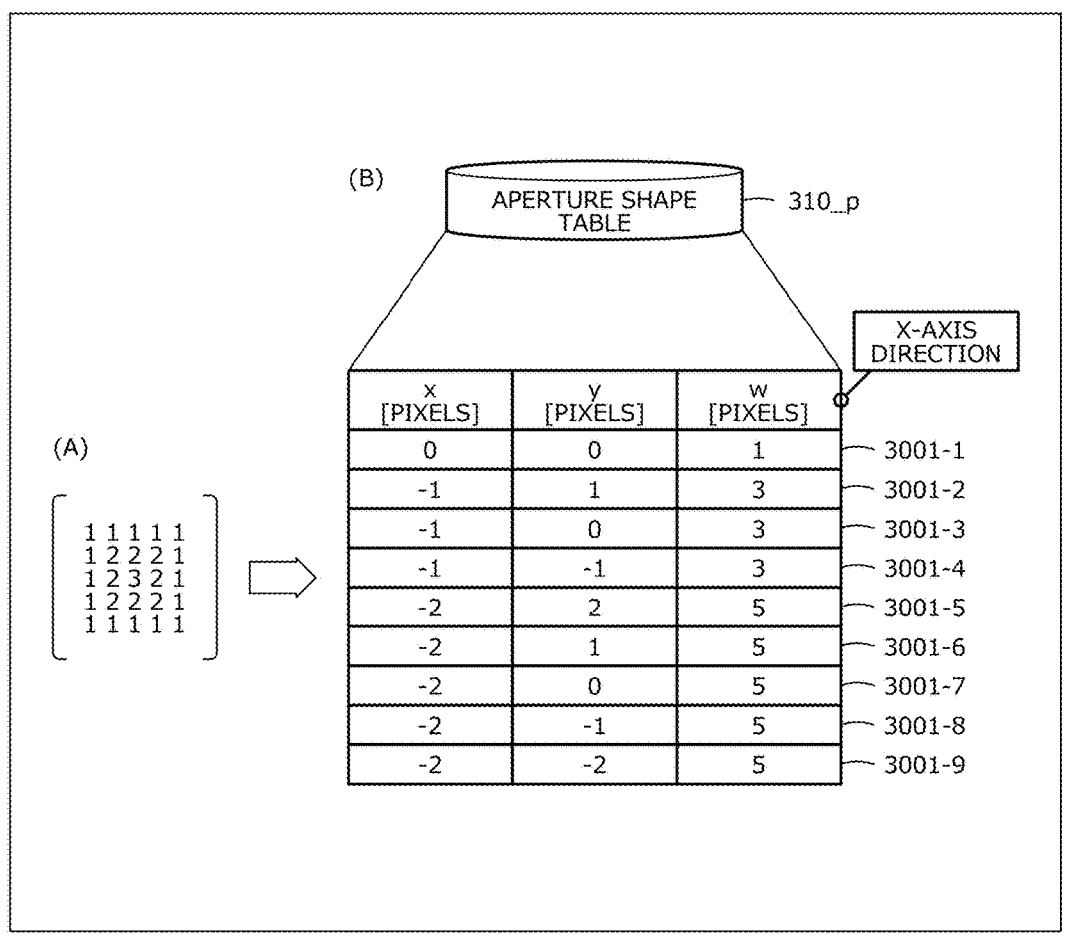
FIG. 30 is an explanatory diagram of a third example of an aperture shape and a third example of storage contents of the aperture shape table.

FIG. 30 is an explanatory diagram of a third example of an aperture shape and a third example of storage contents of the aperture shape table. (A) of FIG. 30 depicts diffusion coefficients when light diffuses in a quadrangular pyramid shape. A diffusion amount is large at a center portion and smaller toward the outside. (B) of FIG. 30 depicts an example of storage contents of an aperture shape table 310_p when light diffuses in a quadrangular pyramid shape. The aperture shape table 310_p stores records 3001-1 to 3001-9.

Figure 31:
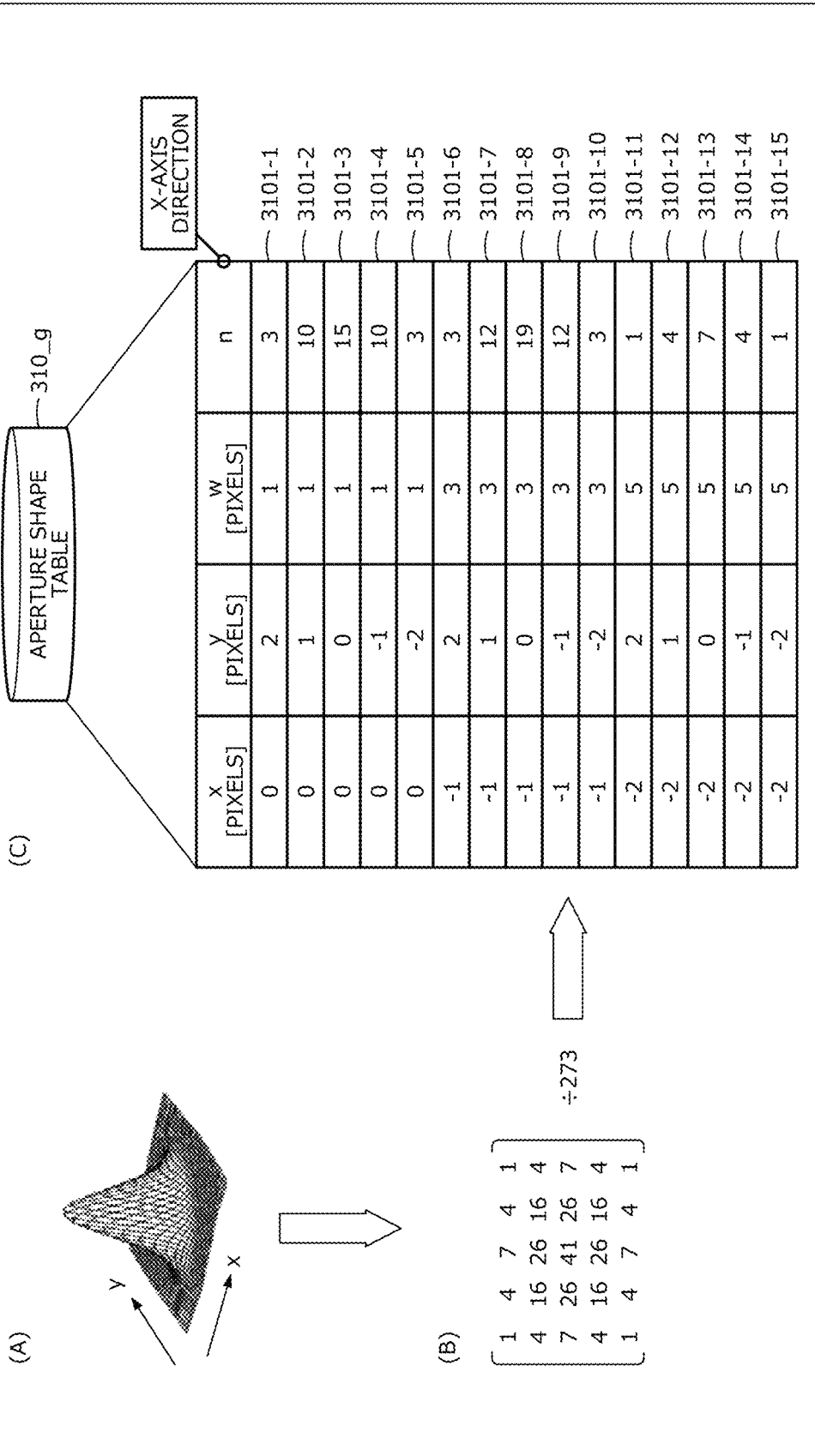
FIG. 31 is an explanatory diagram of a fourth example of an aperture shape and a fourth example of storage contents of the aperture shape table.

FIG. 31 is an explanatory diagram of a fourth example of an aperture shape and a fourth example of storage contents of the aperture shape table. (A) of FIG. 31 depicts how light diffuses when Gaussian blur is applied. (B) of FIG. 31 depicts diffusion coefficients when Gaussian blur is applied. (C) of FIG. 31 depicts an example of storage contents of an aperture shape table 310_g when Gaussian blur is applied. The aperture shape table 310_g stores records 3101-1 to 3101-15. The aperture shape table 310_g has n-fields storing information of magnification at the time of addition, along with the x-, y-, and w-fields.

In a specific method of using the n-fields, the image conversion apparatus 100 executes the operation at step S1108 of FIG. 11 replaced with "CNT[Y2][X]+=LCNT[X+J]*TBL[I]·n". The image conversion apparatus 100 executes the operation at step S1206 of FIG. 12 replaced with "ENG[Y2][X]+=LINE[X]*TBL[I]·n". The inclusion of the n-fields eliminates the need for adding the same fields multiple times and therefore, the processing amount can be reduced.

The process of conversion between the optical energy value and the RGB value will be described. The process of conversion from an RGB value to an optical energy value at step S1002 and the process of conversion from an optical energy value to an RGB value at step S1304 are floating-point arithmetic, and floating-point arithmetic makes a CPU load higher and a process speed slower as compared to integer arithmetic. Therefore, the process of conversion from an RGB value to an optical energy value and the process of conversion from an optical energy value to an RGB value description will be described in terms of a method performed as integer arithmetic. For Equation (1) and Equation (2), k=40 and b=−4 will be used for description.

In the process of conversion from an RGB value to an optical energy value, IN[Y][X] may take one of 256 values from 0 to 255 and therefore, the process can be executed at high speed by reference to a conversion table. For example, the image conversion apparatus 100 preliminarily stores output values of exp(n/40+4.5) when n is set to 0 to 255 into exptbl[n=256]. For example, exptbl=[90, 92, 95, 97, . . . , 52839] is obtained. When converting an RGB value into an optical energy value, the image conversion apparatus 100 obtains a value of exptbl[IN[Y][X]].

In the process of conversion from an optical energy value to an RGB value, e becomes large in Equation (2) and therefore, it is not practical to prepare a conversion table. This problem can be solved with a small table and a simple calculation by utilizing the fact that an n-th bit of an integer indicates n-th power of two. Assuming that the number of the most significant non-zero bits of an integer E is n and that states of bits of n−1, n−2, n−3, . . . are a, b, c, . . . , a value of an optical energy value E is expressed by Equation (3).

$$E=2^n+a\cdot 2^{(n-1)}+b\cdot 2^{(n-2)}+c\cdot 2^{(n-3)}+ \qquad (3)$$

Equation (3) can be converted into Equation (4).

$$E=2^n(1+a/2+b/4+c/8+\ldots) \qquad (4)$$

As a result, a value of log E is converted into Equation (5).

$$\log E=n\cdot\log 2+\log(1+a/2+b/4+c/8+\ldots) \qquad (5)$$

Since log 2 is a constant, a first term can be calculated by a simple multiplication. On the other hand, a second term has resolution defined by determining the number of elements a, b, c, . . . and can be obtained by referring to a table. Since log 2 is 0.693 and is less than one, it is difficult to directly calculate log 2 as an integer. Therefore, the image conversion apparatus 100 executes a process of retaining an appropriate value obtained by multiplication by M and subsequently dividing the value. Similarly, the image conversion apparatus 100 executes a process of creating a table of (log(1+a/2+b/4+ . . . )) with the same magnification for collective division. Once log E can be calculated, luminance D can easily be obtained. A flowchart according to the algorithm described above is depicted in FIG. 32. The flowchart of FIG. 32 will be described on the basis of k=40, b=−4.5, M=4, and a log table having a size of 32.

Figure 32:
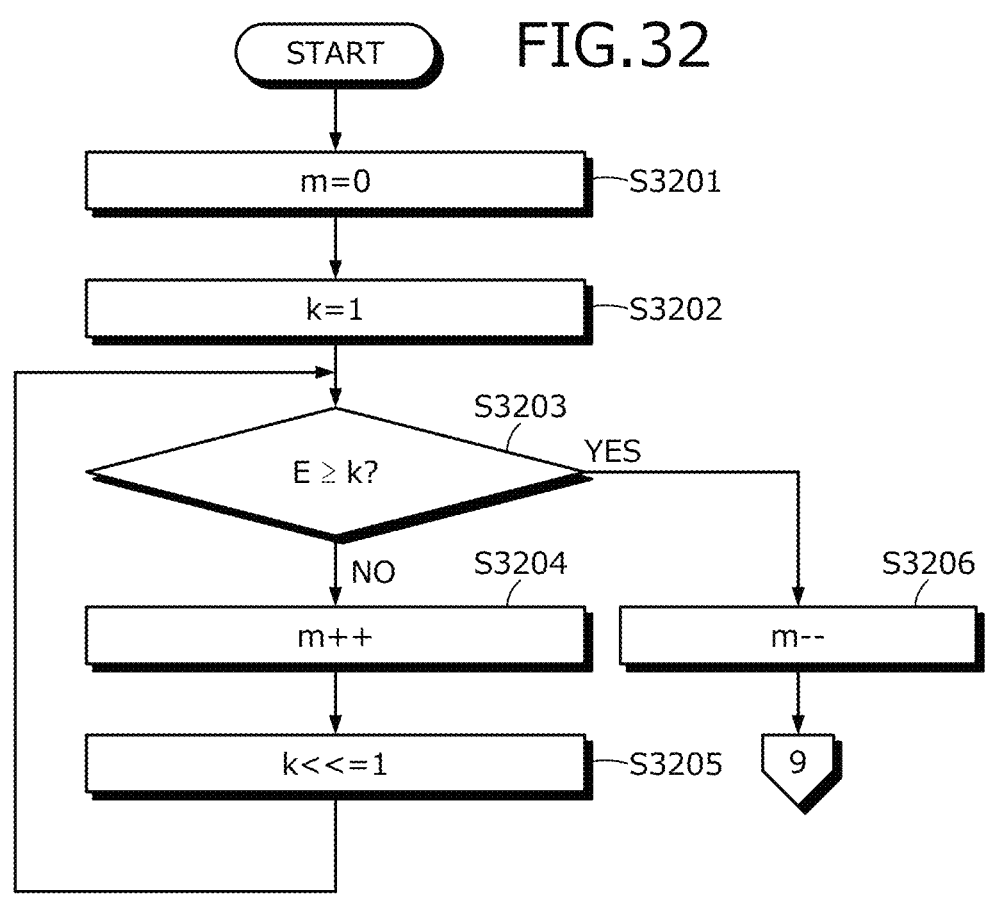
FIG. 32 is a flowchart (part 1) of an example of a procedure of the process of conversion from an optical energy value to an RGB value.

FIG. 32 is a flowchart (part 1) of an example of a procedure of the process of conversion from an optical energy value to an RGB value. The process of conversion from an optical energy value to an RGB value is a process of outputting an RGB value from an optical energy value. Before executing the process of conversion from an optical energy value to an RGB value, the image conversion apparatus 100 stores output values of log(1+n/32)*40*4 obtained by setting n to 0 to 31 into log tbl[n=32]. First in the process of conversion, the image conversion apparatus 100 executes a process of changing expression of the optical energy value E into a format of $(1+e/32) \cdot 2\hat{\ }m$.

First, the image conversion apparatus 100 stores zero as a multiplier m (step S3201). The image conversion apparatus 100 stores one as a variable k indicative of $2\hat{\ }m$ (step S3202). The image conversion apparatus 100 determines whether E is equal to or greater than k (step S3203). If E is less than k (step S3203: NO), the image conversion apparatus 100 increments a value of m (step S3204). The image conversion apparatus 100 stores a result obtained by shifting k by one bit to the left as k (step S3205). It is noted that "<<=" depicted at step S3205 of FIG. 32 is an operator for substituting a value obtained by shifting the left side to the left by the number of bits of the right side for the left side. After termination of the operation at step S3205, the image conversion apparatus 100 goes to the operation at step S3203.

If E is equal to or greater than k (step S3203: YES), $2\hat{\ }m$ is greater than E and therefore, the image conversion apparatus 100 decrements a value of m (step S3206). By executing the operations to step S3206, m is obtained. Subsequently, e is obtained in FIG. 33.

Figure 33:
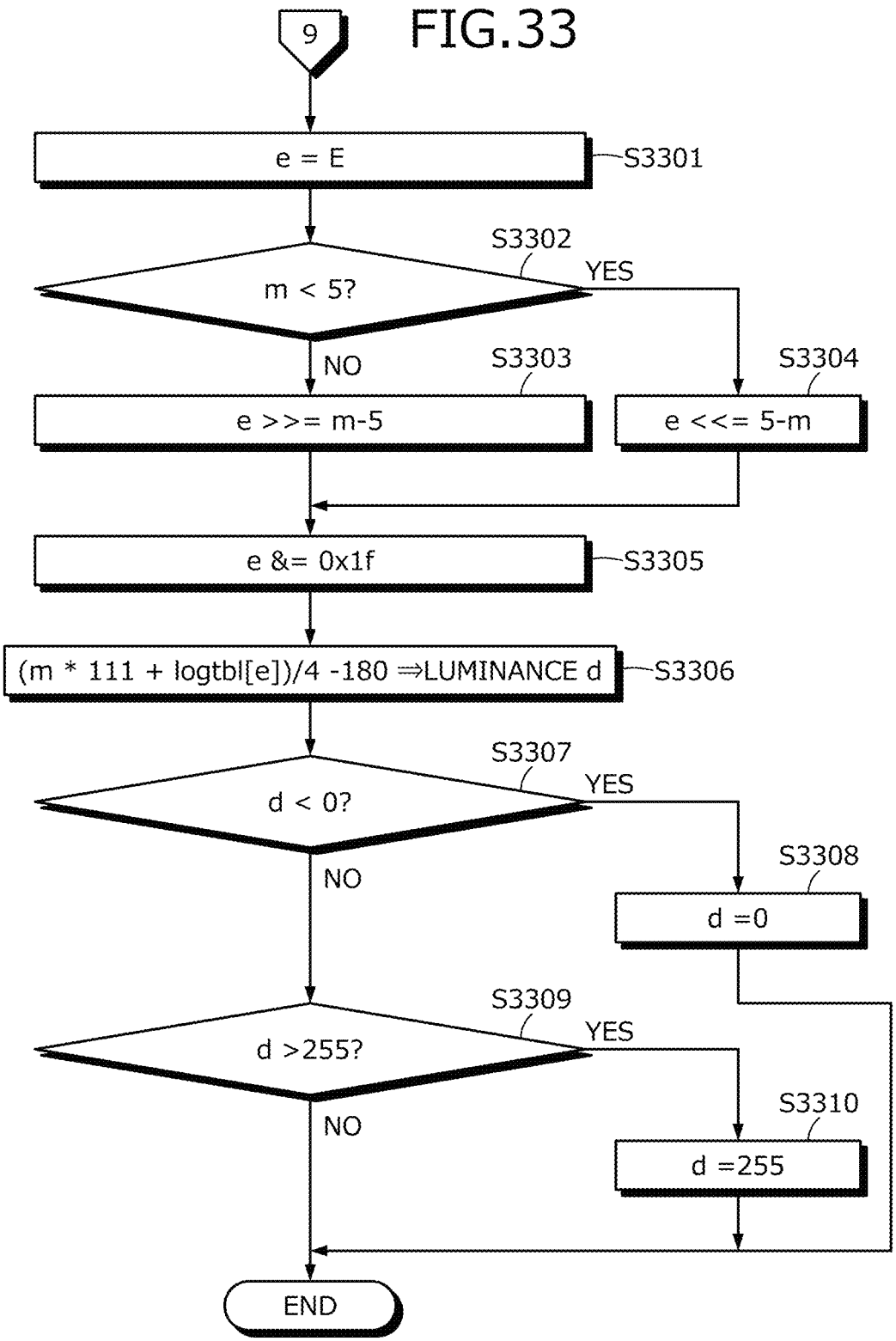
FIG. 33 is a flowchart (part 2) of an example of a procedure of the process of conversion from an optical energy value to an RGB value.

FIG. 33 is a flowchart (part 2) of an example of a procedure of the process of conversion from an optical energy value to an RGB value. The image conversion apparatus 100 stores a value of E as e (step S3301). The process of steps S3302 to S3305 is a process of extracting an integer expressed by the lower five bits from the m−1 bit of e.

After termination of execution of step S3301, the image conversion apparatus 100 determines whether m is less than five (step S3302). The operation at step S3302 is a process of determining whether e is a number of six or more digits in binary. Since m is counted as 0, 1, 2, . . . , a digit number is represented by m+1.

If m is equal to or greater than five (step S3302: NO), the image conversion apparatus 100 stores a value obtained by shifting e to the right by m−5 bits as e (step S3303). As a result of the operation at step S3303, the m−1 bit of e is set as a fifth digit. It is noted that ">>=" depicted at step S3303 of FIG. 33 is an operator for substituting a value obtained by shifting the left side to the right by the number of bits of the right side for the left side. If m is less than five (step S3302: YES), the image conversion apparatus 100 stores a value obtained by shifting e to the left by 5−m as e (step S3304). As a result of the operation at step S3303 or S3304, the most significant bit of e is present as a sixth digit, or as a fifth bit in terms of the number of bits.

After execution of the operation at step S3303 or S3304, to erase the most significant bit to leave the low-order five bits, the image conversion apparatus 100 stores a result obtained as a logical product of e and 0x1f as e (step S3305). It is noted that "&=" depicted at step S3305 of FIG. 33 is an operator for substituting the logical product of the right side and the left side for the left side.

As a result of the process to step S3305, e and m are obtained in the case of $E \approx (1+e/32) \cdot 2\hat{\ }m$. Since this E is exp(D/40+4.5), D can be represented by D=40 log E−180. When this log E is arranged by using $E=(1+e/32) \cdot 2\hat{\ }m$ described above, D can be converted into Equation (6).

$$D=40m \log 2+40 \log(1+e/32)-180=(m*40*4*\log 2+40*4*\log(1+e/32))/4-180 \quad (6)$$

In Equation (6), 40*4*log 2 is about 111 and a value of 40*4*log(1+e/32) is stored in a table log tbl. Therefore, the image conversion apparatus 100 calculates (m*111+log tbl [e])/4−180 and stores the calculation result as the luminance d (step S3306).

Since the luminance d is within a range of 0 to 255, the image conversion apparatus 100 checks whether the luminance d is within the range at steps S3307 to S3310. For example, the image conversion apparatus 100 checks whether d is less than zero (step S3307). If d is less than zero (step S3307: YES), the image conversion apparatus 100 stores zero as d (step S3308). If d is equal to or greater than zero (step S3307: NO), the image conversion apparatus 100 determines whether d is larger than 255 (step S3309).

If d is larger than 255 (step S3309: YES), the image conversion apparatus 100 stores 255 as d (step S3310). If d is equal to or less than 255 (step S3309: NO), or if the operation at step S3308 is terminated, or if the operation at step S3310 is terminated, the image conversion apparatus 100 terminates the process of conversion from an optical energy value to an RGB value. By executing the flowchart depicted in FIGS. 32 and 33, the image conversion apparatus 100 can execute the process of conversion at a speed higher than by Equation (2).

Figure 34:
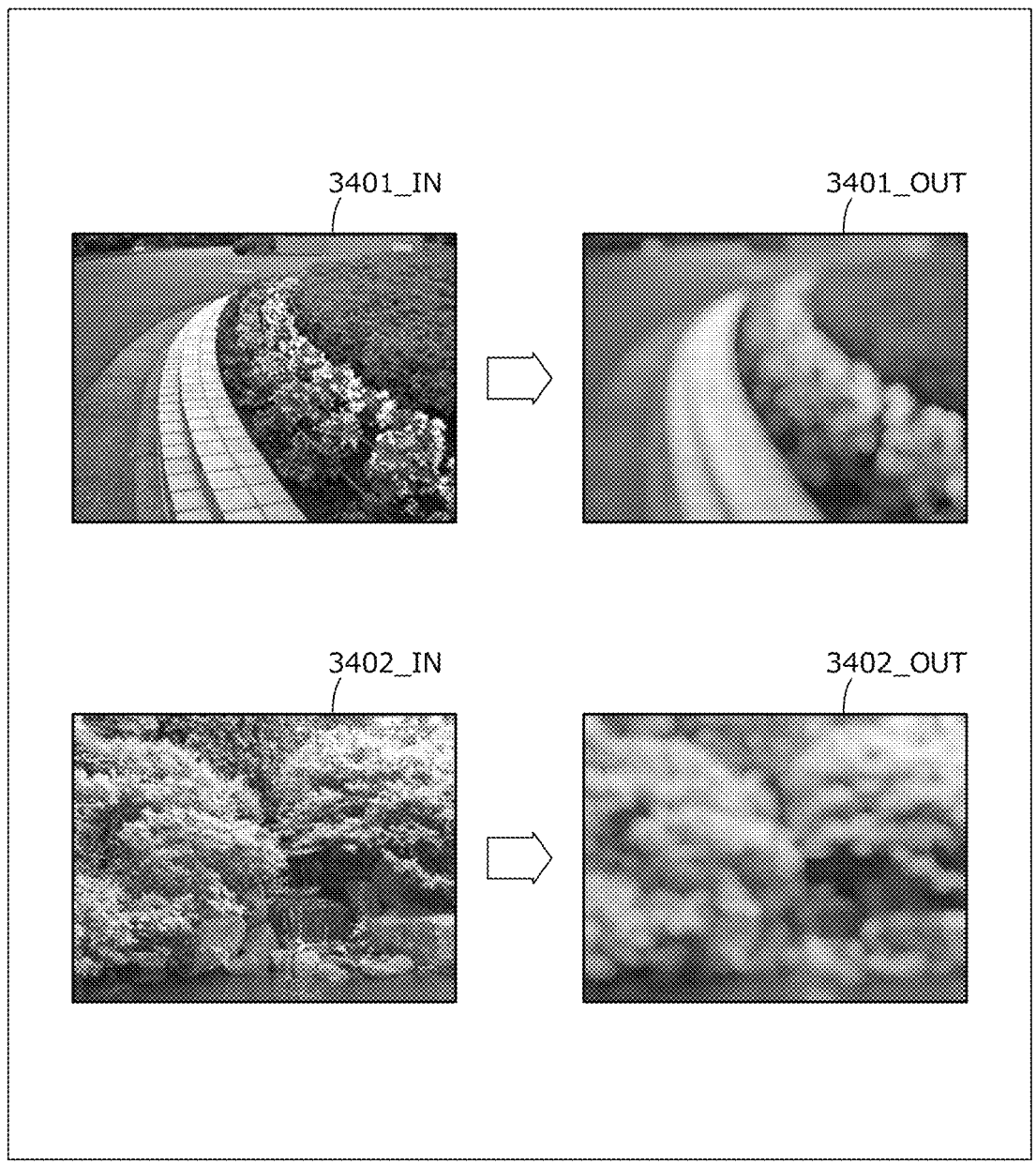
FIG. 34 is an explanatory diagram (part 1) of an example of a result of the image conversion process of the embodiment.

FIG. 34 is an explanatory diagram (part 1) of an example of a result of the image conversion process of the present embodiment. FIG. 34 depicts an original image 3401_IN, an original image 3402_IN, a blurred image 3401_OUT, and a blurred image 3402_OUT when the aperture shape is hexagonal. White portions in the original image 3401_IN and the original image 3402_IN are dispersed as white regions in a hexagonal shape in the blurred image 3401_OUT and the blurred image 3402_OUT.

Figure 35:
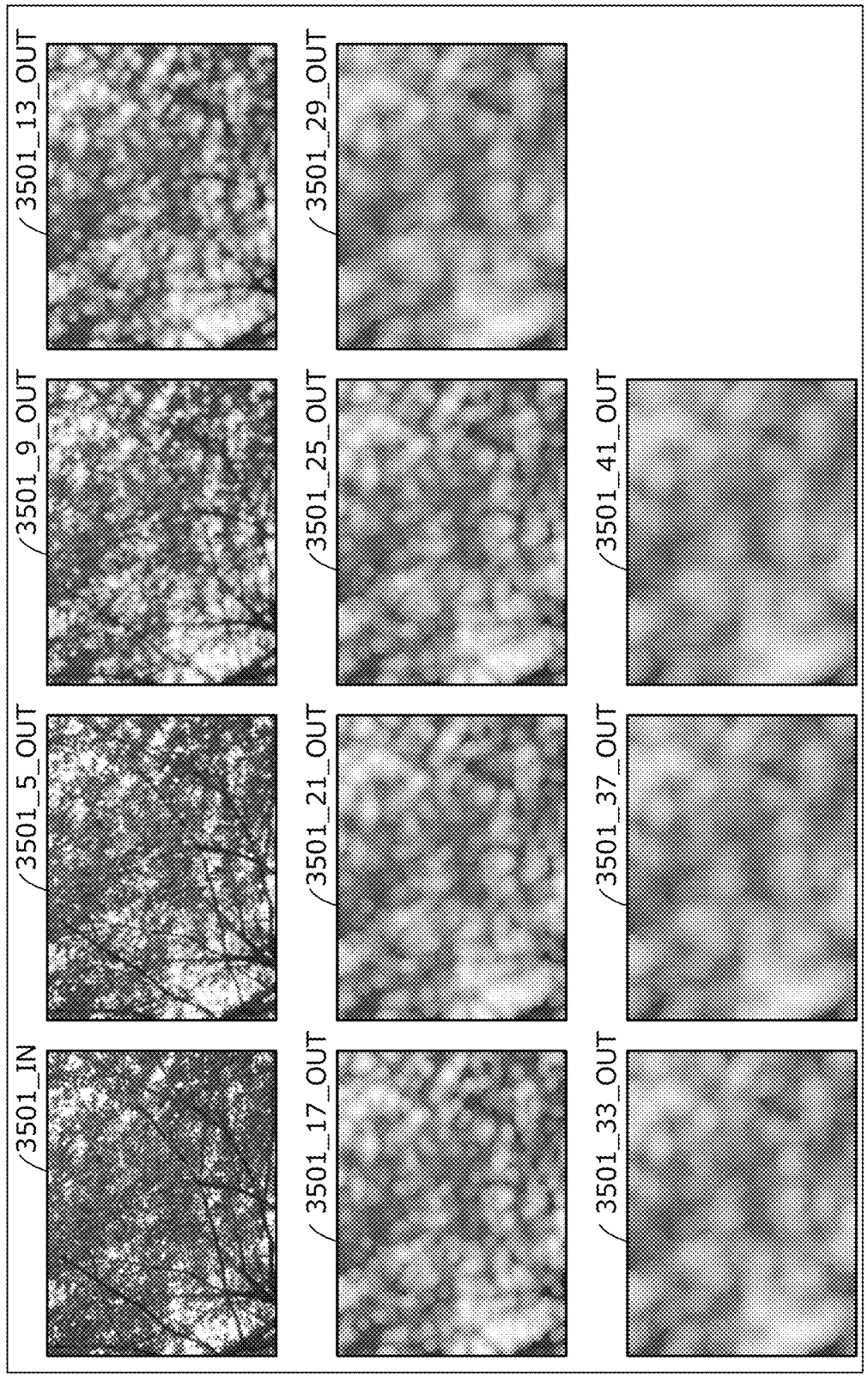
FIG. 35 is an explanatory diagram (part 2) of an example of a result of the image conversion process of the embodiment.

FIG. 35 is an explanatory diagram (part 2) of an example of a result of the image conversion process of the present embodiment. FIG. 35 depicts an original image 3501_IN, and blurred images 3501_5_OUT to 3501_41_OUT. It is noted that "x" of a blurred images 3501_x_OUT indicates a size of the aperture shape. For example, FIG. 35 depicts images with x=5, 9, 13, 17, 21, 25, 29, 33, 37, and 41. White portions of the original image 3501_IN become larger in a hexagonal shape on the blurred images as a size of the aperture shape becomes larger.

Figure 36:
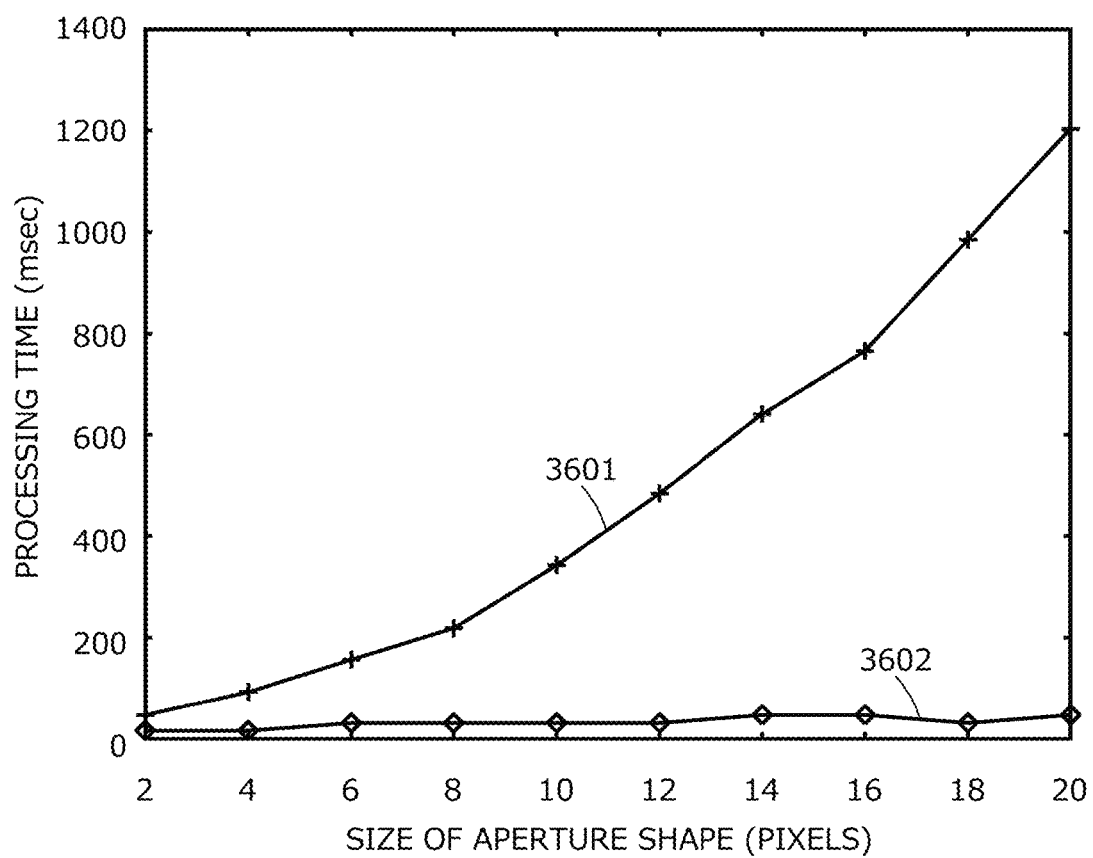
FIG. 36 is an explanatory diagram of comparison of the speed between an image conversion process on the basis of a pixel and the image conversion process of the embodiment.

FIG. 36 is an explanatory diagram of comparison of the speed between an image conversion process on the basis of a pixel and the image conversion process of the present embodiment. FIG. 36 depicts the processing time when an original image with 322 [pixels]×482 [pixels] is converted into a blurred image with a hexagonal aperture shape.

The image conversion process on the basis of a pixel is a process of conversion into a blurred image without using a calculation result. A graph 3601 of the processing time of the image conversion process on the basis of a pixel on FIG. 36 indicates that the processing time becomes longer as the size of the aperture shape becomes larger. For example, when the size of the aperture shape is 20 [pixels], the processing time of the image conversion process on the basis of a pixel is 1200 [msec]. A graph 3602 of the processing time of the image conversion process of the present embodiment indicates that a short processing time can be maintained even when the size of the aperture shape becomes larger. For example, when the size of the aperture shape is 20 [pixels], the processing time of the image conversion process of the present embodiment is about 50 [msec].

As described above, the image conversion apparatus 100 uses a conversion result of a first pixel in a first pixel row overlapping an aperture shape to convert a second pixel in a second pixel row at a relative position coinciding with the first pixel in a region overlapping the aperture shape. As a result, an affecting pixel is common to the first pixel and the second pixel and therefore, for example, the image conversion apparatus 100 can directly reuse the conversion result of the first pixel to reduce the calculation amount during image conversion.

The image conversion apparatus 100 may calculate a value of the second pixel after conversion by using a value of the first pixel that is obtained from conversion of the original image and that is calculated based on a value of a pixel overlapping the given pixel when the aperture shape is moved such that the first pixel is included. As a result, the image conversion apparatus 100 can calculate a reusable conversion result of the first pixel to reuse the conversion result of the first pixel at the time of calculation of the value of the second pixel and therefore, the calculation amount during image conversion can be reduced.

The image conversion apparatus 100 may calculate the value of the second pixel after conversion based on a value of the first pixel in the case of converting the original image and the value of a pixel overlapping the given pixel when the aperture shape is moved such that the second pixel is included. As a result, if a pixel group affecting the second pixel is entirely included in pixels affecting the first pixel, the image conversion apparatus 100 can reuse the conversion result of the first pixel to reduce the calculation amount during image conversion.

For each of respective pixels of the object pixel row, the image conversion apparatus 100 calculates a value of each of the respective pixels after conversion based on values of pixels from each of the respective pixels to a pixel advanced by the pixel count of the first pixel group in either the scanning direction or the direction opposite to the scanning direction. Subsequently, among the values of the respective pixels after conversion, the image conversion apparatus 100 may set as the value of the first pixel, the value of the pixel at a position advanced from the diffusion source pixel in the direction opposite to the given direction by the number of pixels from the pixel at the end in the given direction in the first pixel group to the first pixel. As a result, the image conversion apparatus 100 collectively calculates the moving average for each line and therefore, accesses a continuous region, thereby achieving a higher process speed. If access to a continuous region is available, for example, the region is more likely to be present in a cache line and therefore, the high-speed image conversion process can be achieved.

For each of the respective pixels of the object pixel row, the image conversion apparatus 100 may calculate a value of each of the respective pixels after conversion based on values of pixels from each of the respective pixels to the pixel advanced by the pixel count of the second pixel group, based on a value of each of the respective pixels after conversion calculated by using the pixel count of the first pixel group. As a result, the image conversion apparatus 100 can reuse an already calculated moving average and therefore, can reduce the calculation amount.

The image conversion apparatus 100 may execute the image conversion process according to the scanning direction corresponding to the shape specified by a user. For example, if the number of records of the aperture shape table 310 becomes smaller when the shape specified by the user is scanned along the y-axis rather than being scanned along the x-axis, the image conversion apparatus 100 can select the y-axis as the scanning direction to reduce the calculation amount. The scan along the y-axis and the scan along the x-axis may result in the same number of records of the aperture shape table 310. In this case, the image conversion apparatus 100 can select the x-axis direction enabling a process of a continuous region as the scanning direction, thereby achieving the high-speed image conversion process.

Since the image conversion process according to the present embodiment reduces the calculation amount, the image conversion process can be completed in a short time without causing stress to the user even when being executed on a portable terminal with a low CPU processing capability, such as a smartphone and a mobile telephone. The image conversion process according to the present embodiment may be executed on a personal computer. For example, if a photographic image is processed, a foreground and a background may be divided by another application capable of dividing a foreground and a background and the image conversion process according to the present embodiment may be executed for the background. This enables user to acquire an excellent blurred image like those taken by a camera in a short time.

The image conversion method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the recording medium, and executed by the computer. The program may be distributed through a network such as the Internet.

An aspect of the present invention produces an effect that the processing time of the process of giving a blurring effect can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing therein an image conversion program that causes a computer to execute a process comprising:

extracting, among pixel rows parallel to an object pixel row in an image to be converted, a first pixel row overlapping a region formed of a pixel group within a predetermined range from a given pixel of the object pixel row and a second pixel row having a number of pixels successively overlapping the region equal to or greater than that of the first pixel row;

acquiring a pixel count from a pixel at an end of a first pixel group that is included in the region and the extracted first pixel row, to a first pixel included in the first pixel group, the end being an end point in a given direction that is any one among a scanning direction of the object pixel row and a direction opposite to the scanning direction;

identifying a second pixel by advancing from the pixel at the end in a second pixel group that is included in the region and the extracted second pixel row, in a direction opposite to the given direction, by the acquired pixel count;

calculating a value of the second pixel in a case of converting an original image by referring to a storage device that stores therein a value of the first pixel in the case of converting the image; and identifying out of the object pixel row, a pixel that overlaps the given pixel after the given pixel is moved parallel to the object pixel row such that the second pixel is included in a region formed of the pixel group within the predetermined range from the given pixel after the given pixel is moved parallel to the object pixel row, wherein the calculating the value of the second pixel includes calculating the value of the second pixel in the case of converting the image, based on the value of the first pixel in the case of converting the image and a value of the identified pixel.

2. The recording medium according to claim 1, the process further comprising:

identifying out of the object pixel row, a pixel that overlaps the given pixel after the given pixel is moved parallel to the object pixel row such that the first pixel is included in a region formed of the pixel group within the predetermined range from the given pixel after the given pixel is moved parallel to the object pixel row, and calculating the value of the first pixel in the case of converting the image, based on a value of the identified pixel, wherein the calculating the value of the second pixel includes calculating the value of the second pixel in the case of converting the image, based on the calculated value of the first pixel.

3. The recording medium according to claim 1, the process further comprising calculating for each of respective pixels of the object pixel row, a value of each of the respective pixels related to the first pixel row in the case of converting the image, the calculating being based on values of pixels from each of the respective pixels to a pixel identified by moving by the pixel count in the given direction of the first pixel group, and setting as the value of the first pixel in the case of converting the image and setting from among the calculated values of the respective pixels related to the first pixel row, a value of a pixel at a position identified by moving from the given pixel, in the direction opposite to the given direction, by the pixel count from the pixel at the end in the given direction in the first pixel group to the first pixel, wherein the calculating the value of the second pixel includes calculating the value of the second pixel in the case of converting the image, based on the calculated value of the first pixel.

4. The recording medium according to claim 3, the process further comprising calculating for each of the respective pixels, a value of each of the respective pixels related to the second pixel row in the case of converting the image, the calculating being based on values of pixels from a next pixel subsequent to the pixel at a position identified by moving each of the respective pixels by the pixel count in the given direction of the first pixel group and based on the calculated values of the respective pixels related to the first pixel row, wherein the calculating the value of the second pixel includes calculating the value of the second pixel in the case of converting the image, the calculating being based on among the calculated values of the respective pixels related to the second pixel row, the value of the pixel at the position advanced from the given pixel in the direction opposite to the given direction by the pixel count from the pixel at the end in the given direction in the first pixel group to the second pixel.

5. The recording medium according to claim 1, the process further comprising:

selecting the scanning direction according to a specified shape, by referring to a table that stores, and thereby correlates, a shape of a region formed of a pixel group and a scanning direction;

acquiring the object pixel row out of the image by scanning in the selected scanning direction; and extracting the first pixel row and the second pixel row after acquiring the object pixel row.

6. An image conversion apparatus comprising:

a storage device; and a processor that:

extracts among pixel rows parallel to an object pixel row in an image to be converted, a first pixel row overlapping a region formed of a pixel group within a predetermined range from a given pixel of the object pixel row and a second pixel row having a number of pixels successively overlapping the region equal to or greater than that of the first pixel row;

acquires a pixel count from a pixel at an end of a first pixel group that is included in the region and the extracted first pixel row, to a first pixel included in the first pixel group, the end being an end point in a given direction that is any one among a scanning direction of the object pixel row and a direction opposite to the scanning direction;

identifies a second pixel by advancing from the pixel at the end in a second pixel group that is included in the region and the extracted second pixel row, in a direction opposite to the given direction, by the acquired pixel count;

calculates a value of the second pixel in a case of converting an original image by referring to the storage device that stores therein a value of the first pixel in the case of converting the image; and identifies out of the object pixel row, a pixel that overlaps the given pixel after the given pixel is moved parallel to the object pixel row such that the second pixel is included in a region formed of the pixel group within the predetermined range from the given pixel after the given pixel is moved parallel to the object pixel row, wherein the calculating the value of the second pixel includes calculating the value of the second pixel in the case of converting the image, based on the value of the first pixel in the case of converting the image and a value of the identified pixel.

7. An image conversion method comprising:

extracting by a computer and from among pixel rows parallel to an object pixel row in an image to be converted, a first pixel row overlapping a region formed of a pixel group within a predetermined range from a given pixel of the object pixel row and a second pixel row having a number of pixels successively overlapping the region equal to or greater than that of the first pixel row;

acquiring, by the computer, a pixel count from a pixel at an end of a first pixel group that is included in the region and the extracted first pixel row, to a first pixel included in the first pixel group, the end being an end point in a given direction that is any one among a scanning direction of the object pixel row and a direction opposite to the scanning direction;

identifying, by the computer, a second pixel by advancing from the pixel at the end in a second pixel group that is included in the region and the extracted second pixel row, in a direction opposite to the given direction, by the acquired pixel count;

calculating, by the computer, a value of the second pixel in a case of converting an original image by referring to a storage device that stores therein a value of the first pixel in the case of converting the image; and identifying out of the object pixel row, a pixel that overlaps the given pixel after the given pixel is moved parallel to the object pixel row such that the second pixel is included in a region formed of the pixel group within the predetermined range from the given pixel after the given pixel is moved parallel to the object pixel row, wherein the calculating the value of the second pixel includes calculating the value of the second pixel in the case of converting the image, based on the value of the first pixel in the case of converting the image and a value of the identified pixel.

* * * * *